US008032083B2

(12) United States Patent
Mösker et al.

(10) Patent No.: US 8,032,083 B2
(45) Date of Patent: Oct. 4, 2011

(54) METHOD FOR ESTABLISHING A WIRELESS, AUTONOMOUS COMMUNICATIONS NETWORK, TRANSCEIVER AND BASE STATION OF A WIRELESS, AUTONOMOUS COMMUNICATIONS NETWORK AND CORRESPONDING WIRELESS, AUTONOMOUS COMMUNICATIONS NETWORK

(75) Inventors: Volker Mösker, Isselburg (DE); Andreas Winkler, Korschenbroich (DE)

(73) Assignee: Siemens Aktiengesellschaft, Munich (DE)

( * ) Notice: Subject to any disclaimer, the term of this patent is extended or adjusted under 35 U.S.C. 154(b) by 1556 days.

(21) Appl. No.: 10/570,425

(22) PCT Filed: Jun. 2, 2005

(86) PCT No.: PCT/EP2005/052540
§ 371 (c)(1),
(2), (4) Date: Mar. 2, 2006

(87) PCT Pub. No.: WO2005/120089
PCT Pub. Date: Dec. 15, 2005

(65) Prior Publication Data
US 2008/0316943 A1 Dec. 25, 2008

(30) Foreign Application Priority Data
Jun. 2, 2004 (DE) .......................... 10 2004 026 775

(51) Int. Cl.
*H04B 7/00* (2006.01)
(52) U.S. Cl. .................... 455/41.2; 455/456.1; 455/41.3; 455/11.1; 455/507; 455/509

(58) Field of Classification Search ........................ None
See application file for complete search history.

(56) References Cited

U.S. PATENT DOCUMENTS

| 5,987,011 | A | * | 11/1999 | Toh | 370/331 |
| 2001/0012757 | A1 | | 8/2001 | Boyle | |
| 2002/0082035 | A1 | * | 6/2002 | Aihara et al. | 455/518 |

FOREIGN PATENT DOCUMENTS

| DE | 199 30 423 | | 1/2001 |
| DE | 199 30 423 | A1 | 1/2001 |
| EP | 1 261 171 | | 11/2002 |
| EP | 1 261 171 | A2 | 11/2002 |

(Continued)

OTHER PUBLICATIONS

XP 002215199 "Specification of the Bluetooth System, Specification vol. 1, Wireless Connections made easy, Core, v1.0 B" Specification of the Bluetooth System, Dec. 1, 1999 pp. 108, 1039-1041.
002215199 "Specification of the Bluetooth System, Specification vol. 1, Wireless Connections made easy, Core, v1.0 B" Specification of the Bluetooth System, Dec. 1, 1999 pp. 108, 1039-1041.

*Primary Examiner* — Charles Appiah
*Assistant Examiner* — Randy Peaches
(74) *Attorney, Agent, or Firm* — Occhiuti Rohlicek & Tsao LLP

(57) ABSTRACT

The present disclosure provides optimal network performance and network illumination in a wireless, autonomous communications network with a dynamic network topology achieved by auto-configuration. Functional alogorthemic enhancements of the communications network are used, enabling the communications network to automatically determine the current network configuration and the accessibility of the transceivers that are associated with the communications network by using measurements and to determine the optimal position of a master station at any one time from the data obtained from the measurements.

41 Claims, 17 Drawing Sheets

FOREIGN PATENT DOCUMENTS

| | | |
|---|---|---|
| EP | 1324540 | 7/2003 |
| WO | WO 02/087172 | 10/2002 |
| WO | WO 02/087172 A1 | 10/2002 |
| WO | WO 02087172 A1 * | 10/2002 |

* cited by examiner

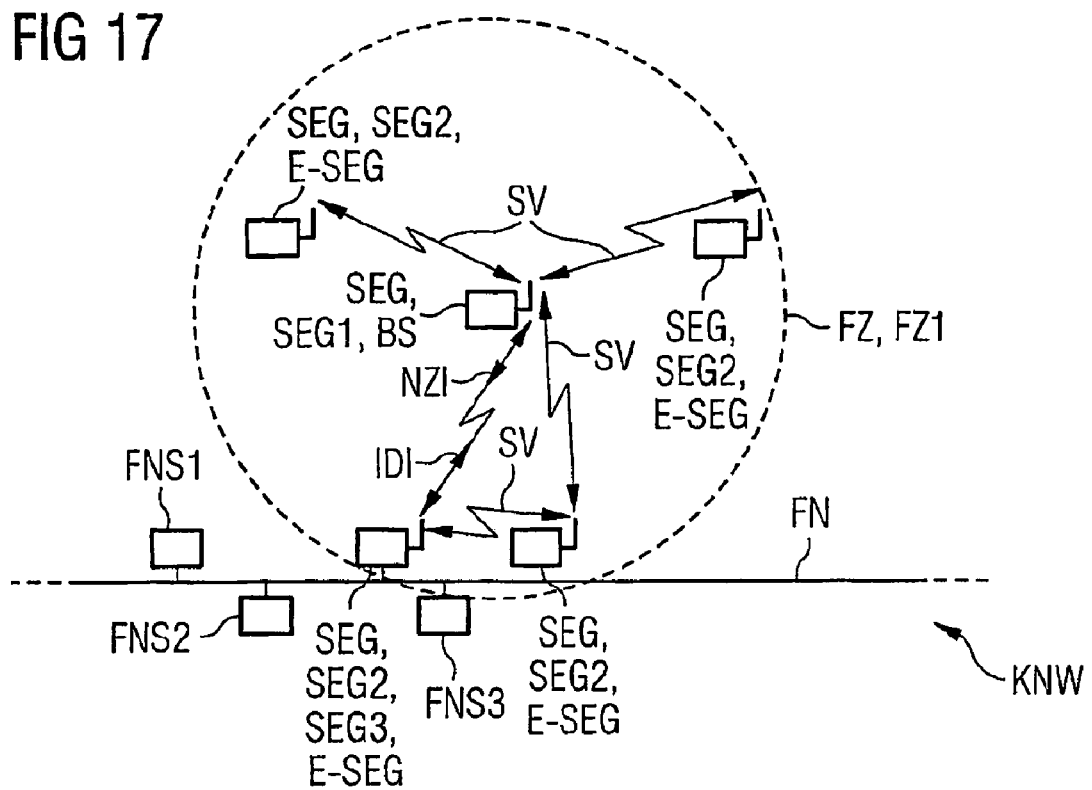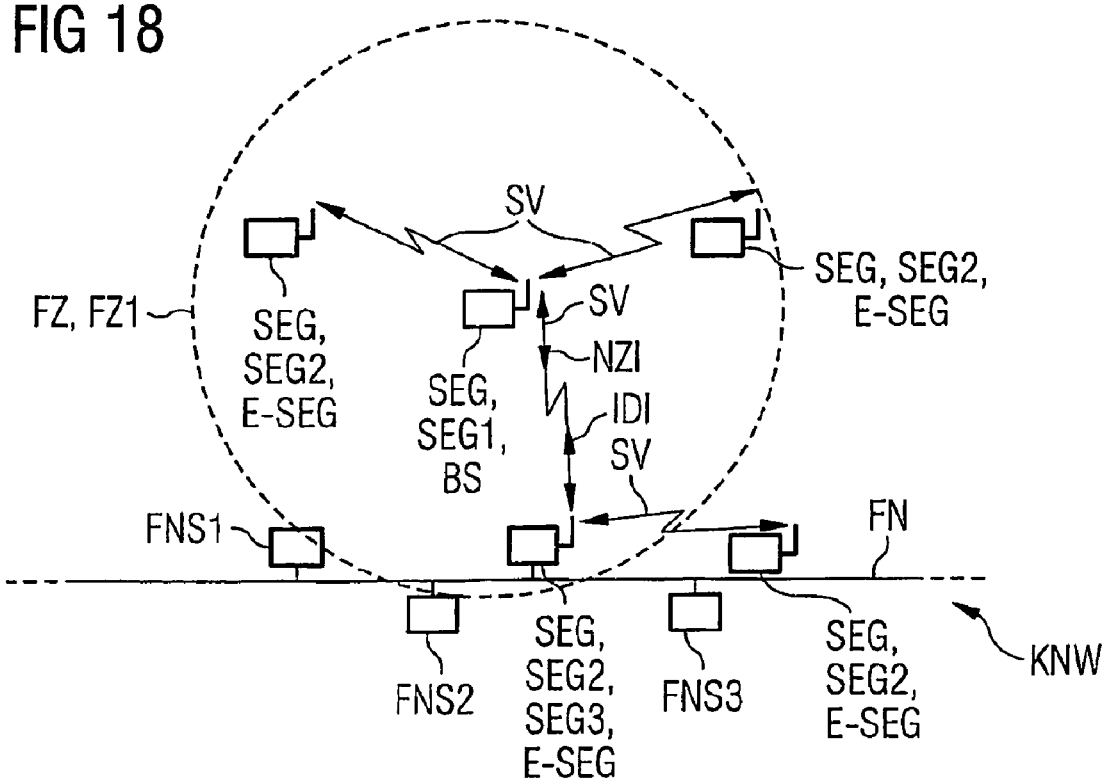

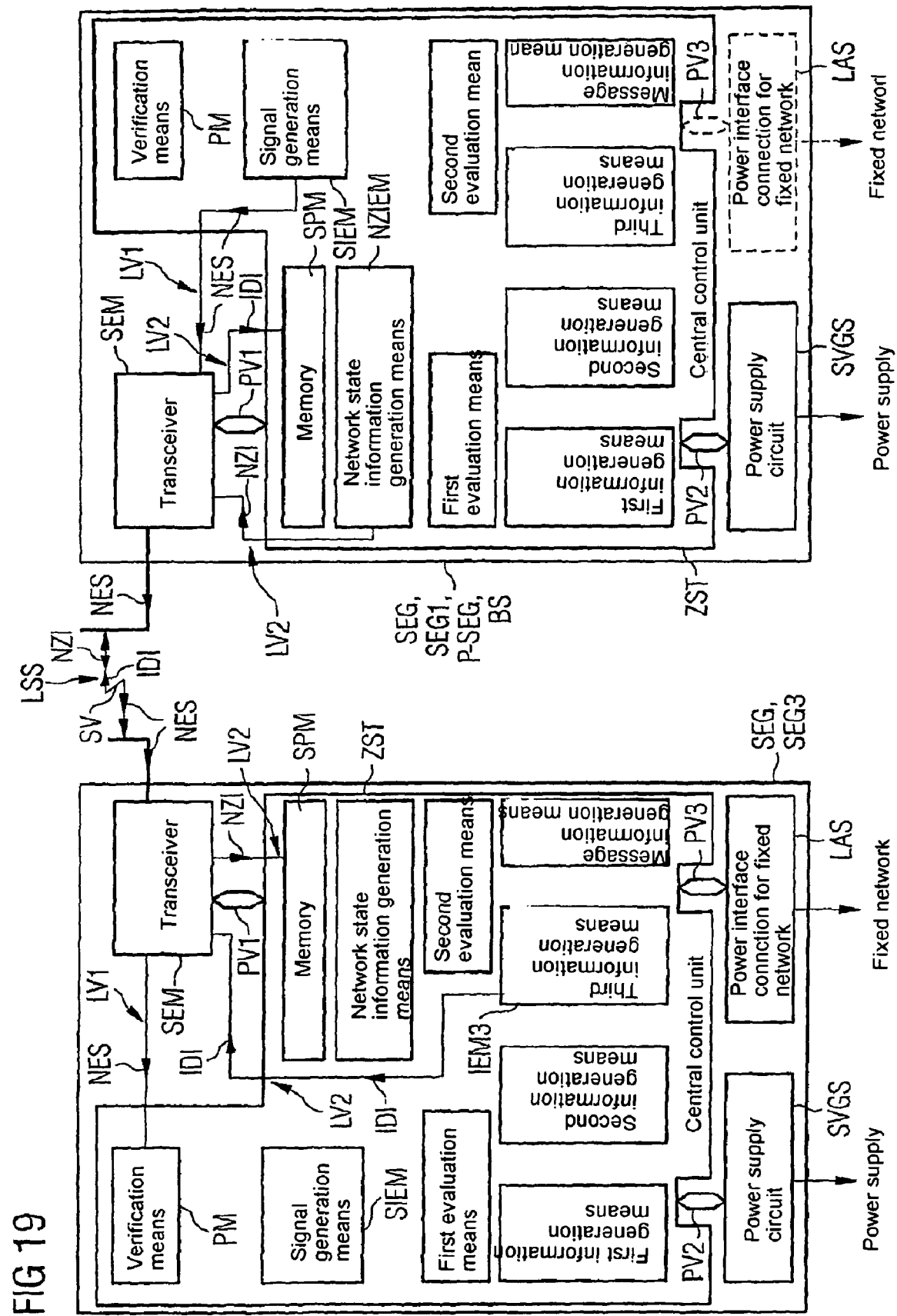

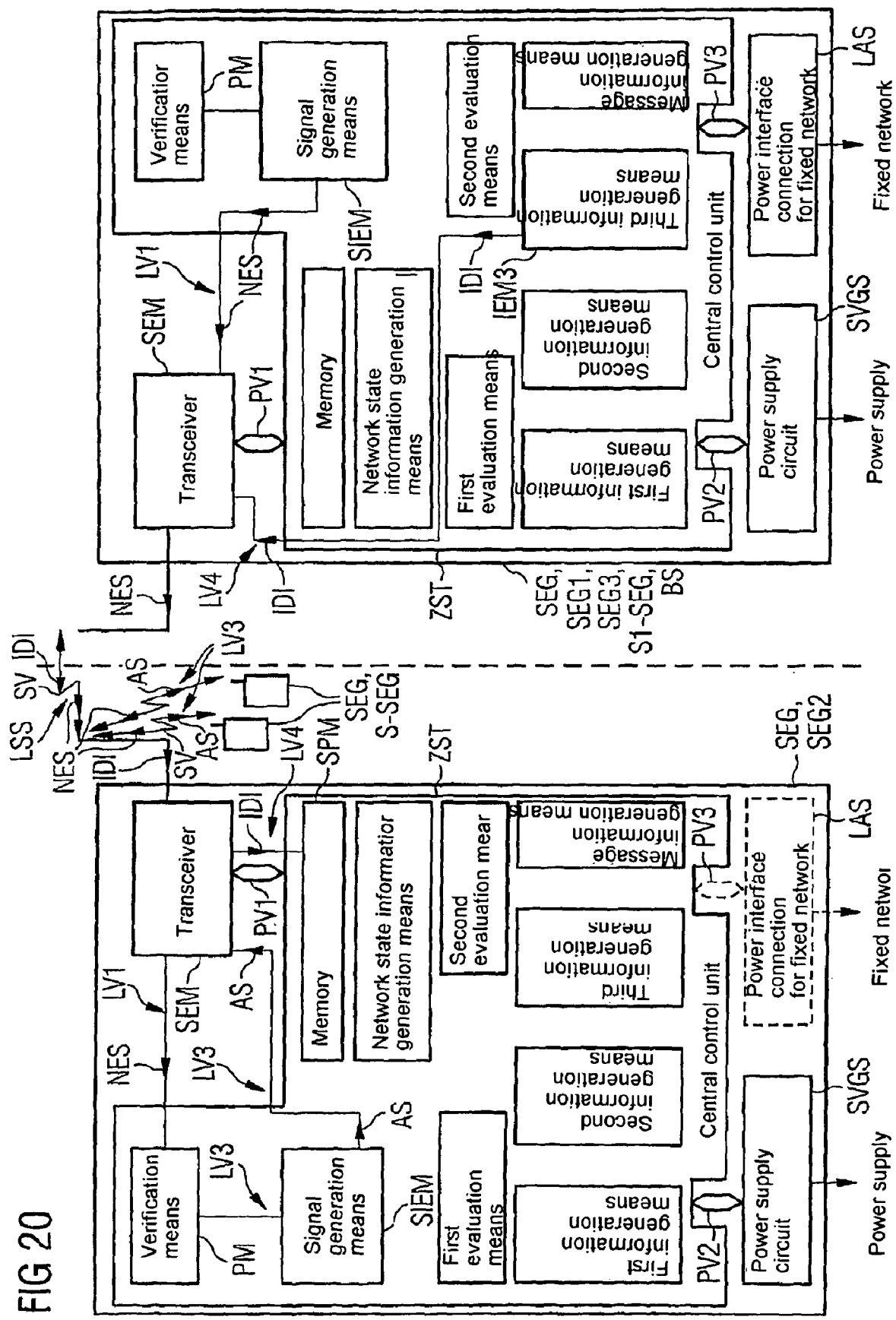

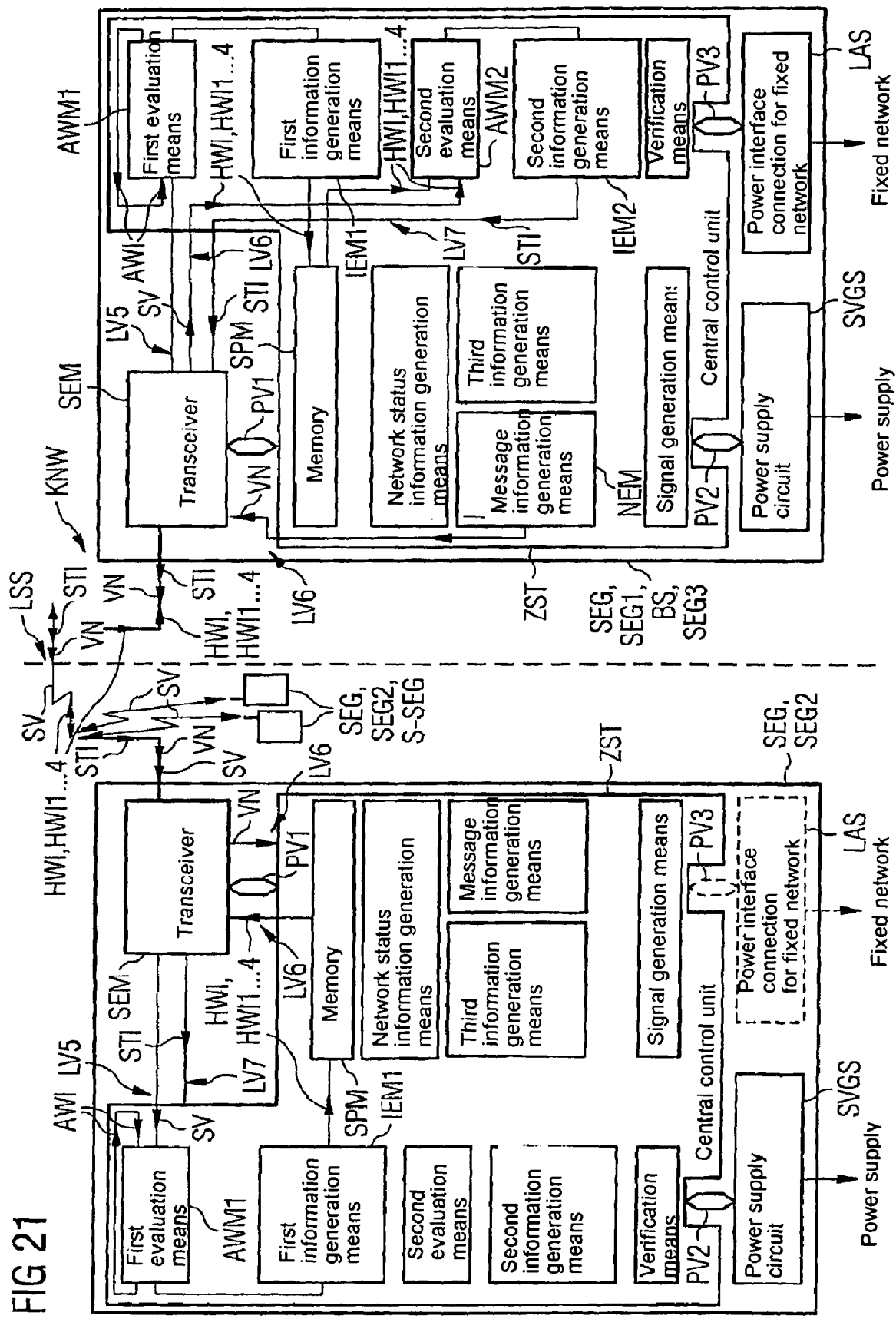

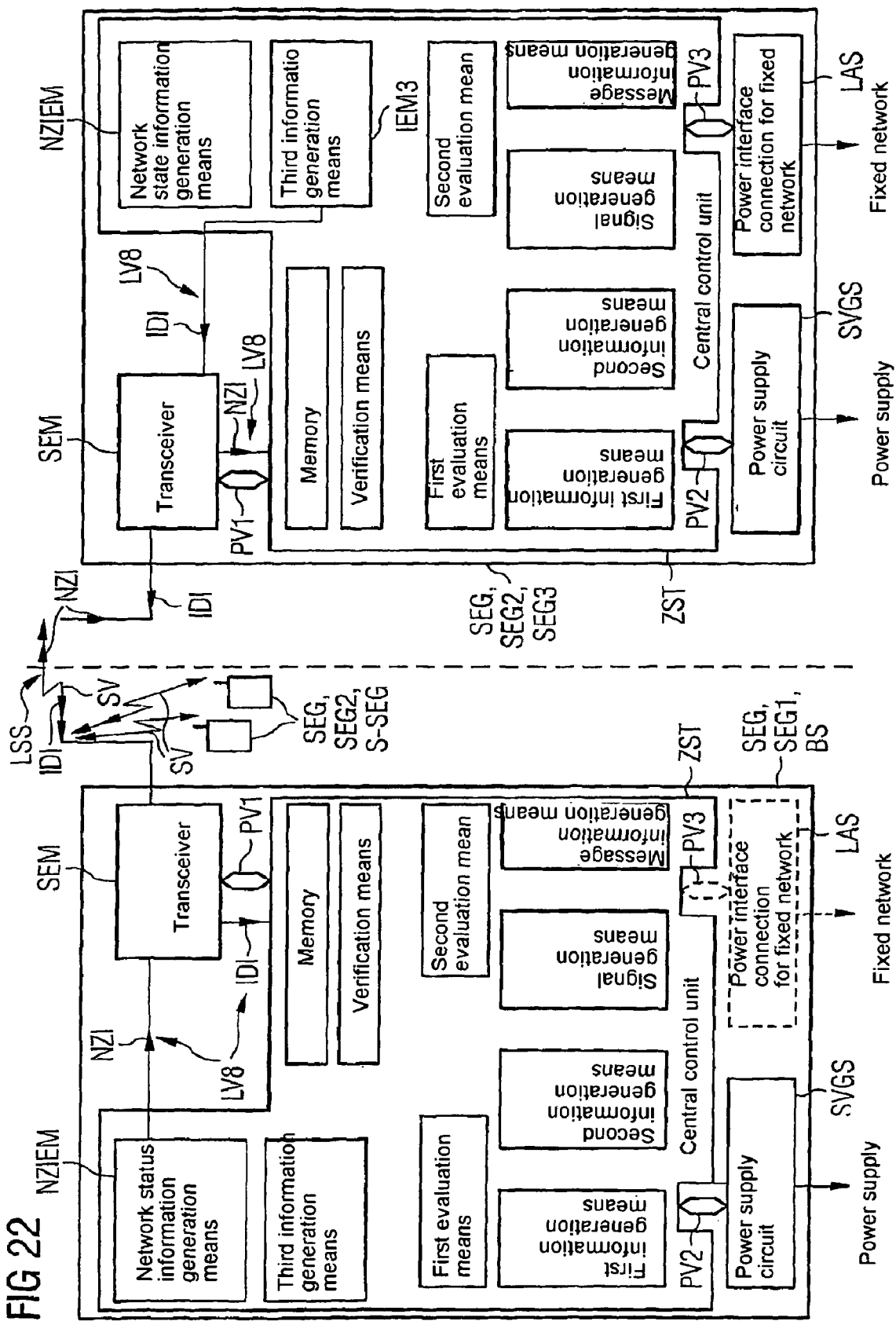

METHOD FOR ESTABLISHING A WIRELESS, AUTONOMOUS COMMUNICATIONS NETWORK, TRANSCEIVER AND BASE STATION OF A WIRELESS, AUTONOMOUS COMMUNICATIONS NETWORK AND CORRESPONDING WIRELESS, AUTONOMOUS COMMUNICATIONS NETWORK

FIELD OF TECHNOLOGY

The present disclosure relates to a method for establishing a wireless, autonomous communications network, a transceiver, a base station operating in a wireless, autonomous communications network

BACKGROUND

In wireless communications networks, e.g. computer networks functioning in conformance with the IEEE standard 802.11a/b/g (WLAN standard) which are set up from a base station which can for its part also forward data traffic, the accessibility of all the transceivers that are associated with the communications network (e.g. fixed or mobile stations for wireless telecommunications)—in other words of the subscribers—depends on the respective position of the device concerned, which can be configured as a mobile or fixed device, in relation to a master station or base station preferably configured as an access point.

The devices which are not located within visual range of the master station or base station will be unable to be associated with the network. Since the master station or base station is capable of forwarding data traffic, two devices which cannot see one another directly can nevertheless communicate with one another via the master station or base station.

Accordingly, an optimal placement of the master station or base station can, in turn, optimize the performance and the illumination of a communications network.

SUMMARY

An optimization, even if only restricted, is provided by a manual intervention in the network topology. Optimization by means of a manual intervention is, however, not possible when the communications network has an access to a fixed network and this access is generally implemented via the master station or base station.

As such, a method is provided for establishing a wireless, autonomous communications network, a transceiver and a base station of a wireless, autonomous communications network as well as a wireless, autonomous communications network in which an optimal network performance and network illumination is achieved in a dynamic network topology by auto-configuration.

Through functional enhancements of a communications network (implementation of an algorithm/a method), the communications network itself is enabled (automatically) to determine the current network configuration and the accessibility of transceivers associated with the communications network, preferably as mobile and/or fixed transceivers, which function e.g. as WLAN and/or DECT devices, by means of measurements and to determine the optimal position of a master station or base station, which compared with the other transceivers holds a basic functionality enhanced with the master-station or base-station functionality, at any one time from the data obtained from said measurements.

In cases where the communications network has an access to a fixed network, this fixed-network access of the wireless communications network is separated from the master-station or base-station functionality in that the fixed-network access is not necessarily simultaneously implemented via the master station or base station, so it is possible to position the station randomly in order to achieve an optimal network configuration. The dynamic placement of the master station or base station obtained in this way (placement in the sense that the functionality of the master station or base station is transferred to a different transceiver in the communications network) enables the network autonomously and without manual interventions to determine and assume the current optimal configuration in each case. The possibility of auto-configuration of the network also means that, for the first time, a failure of the master station or base station can be compensated autonomously by the network, in that one of the remaining transceivers automatically takes over the functionality of the master station or base station. Besides the basic functionality of this configuration, the remaining transceivers also hold the enhanced master-station or base-station functionality in order to take over the functionality of the master station or base station.

A major advantage of the proposed configuration is that the solution can be implemented by means of software changes alone.

The enrichment of the prior art which is connected with the technical doctrine specified in each case lies firstly in the automatic network configuration and secondly in the manner in which this automatic network configuration is brought about.

If the communications network, e.g. a wireless computer network functioning in conformance with the IEEE standard 802.11a/b/g (WLAN standard), is put into operation and if, on account of a sub-optimal placement of the master station or base station, not all the devices in the computer network are able to join the network, the network is able autonomously and without manual intervention to detect this situation and, by transferring the master-station or base-station functionality to a different device, to achieve the outcome that all the devices fall within the range of the network, insofar as the position of the individual devices in relation to one another permits this.

If there are multiple wireless transceivers, of which one device has access to a wire-bound network (fixed network) with fixed-network stations, such as base station of a communications network, then it cannot always be assumed as a matter of course that all the transceivers will be able to participate in the network. Thus, there will, as shown in FIGS. 11 to 18, always be devices which are not located within direct communication range of the transceiver with the fixed-network connection. The algorithm/method contained in the present disclosure ensure that the transceiver which is best suited for the purpose is given the base-station functionality of the communications network.

The selection criteria for optimal suitability can be chosen freely or can be adapted to the circumstances in the communications network concerned. Thus, it is possible to choose the criteria for example through the type of advisory information contained such that the master-station or base-station functionality is given to the transceiver which is located within communication range of the most transceivers and is located within communication range of the transceiver which has the fixed-network access. The last condition is of course also fulfilled if the particular transceiver which is given the master-station or base-station functionality also has the fixed-network access. If, however, the communications network has no fixed-network access, then the last condition is superfluous.

In detail, an exemplary algorithm or method functions as follows:

To begin with, when the communications network is started up, all the transceivers monitor the environment for existing established networks. This is done by checking whether a network existence signal is being received. If this is the case, then the transceiver transmitting the network existence signal is the device with the master-station or base-station functionality, that is, the master station or base station. If no networks exist or if no network existence signal is received, then they themselves start to establish a network. In this process, it can occur that devices which cannot see one another directly, i.e. are not located within direct communication range of one another, establish a network simultaneously. If a transceiver now exists which can see multiple networks simultaneously, then this transceiver must now send an instruction either to all the transceivers or to all the transceivers except one transceiver to close their networks. In this case, either the transceiver transmitting the instruction or the transceiver not receiving the instruction is the master station or base station.

In a subsequent measurement phase, all the transceivers continue to monitor the environment for signal traffic of other transceivers. This signal traffic can consist of frames which are addressed to the transceiver concerned or frames which are transmitted to other transceivers or of special broadcast frames which are intended only for measurement purposes and have to contain a unique identification of the transmitting device.

These special broadcast frames are transmitted at regular intervals. The receiving transceivers have to record the receivable transceivers in a table in which information about the quality of the connections to these transceivers can also be stored.

After the measurement phase, the master station or base station is now supposed to transmit a further broadcast frame by means of which it prompts all the transceivers which are able to receive it to transmit their collected data about the receivable transceivers to the master station or base station.

With the aid of the data transmitted by the individual transceivers, the master station or base station is now able to recognize whether a transceiver is available in its reception range which, in comparison with it, is better suited as a master station or base station. If that is not the case, then the master station or base station retains the master-station or base-station functionality. Otherwise, the transceiver functioning as a master station or base station now has to surrender its master-station or base-station functionality to the better suited transceiver. To do this, the transceiver functioning as a master station or base station transmits a frame by means of which it signals to the better suited device that it is surrendering the master-station or base-station functionality and that the addressed transceiver should take over this functionality. In this process, configuration data relating to the network (e.g. devices associated with the network) can also be transferred to the new master station or base station (cf. FIGS. 3, 7, 15, 16).

The network after the transfer of base station functionality can be seen in FIGS. 4, 8 to 10, 17 and 18, respectively.

If the communications network has an access to the fixed network, then this circumstance must be taken into account in the algorithm/the method as follows:

If a transceiver provides a fixed-network access and if this transceiver does not have the master-station or base-station functionality, then it should be ensured that this transceiver always receives up-to-date information about the wireless network as regards its associated members. Otherwise, the transceiver would be unable to decide which data packets have to be forwarded from the fixed network to the wireless network.

If a transfer of the master-station or base-station functionality occurs, then it should be ensured that the new base station remains constantly within visual range of the transceiver via which the fixed-network access is implemented. If this is not the case, the devices associated with the wireless network, which see the (new) master station or base station but not the transceiver with the fixed-network access could be cut off from the fixed network.

The disclosed algorithm/method ensures furthermore that the algorithm/method also functions in the case of an optional direct connection between transceivers in the communications network.

If the possibility of a direct connection between two transceivers exists, i.e. the data traffic does not necessarily have to run via the master station or base station, it should be ensured that each transceiver identifies possible direct interlocutors and, provided it is in range, also the transceiver with the fixed-network access. This can be achieved via the aforementioned special broadcast frames with, the transceiver with the fixed-network access setting a special identification bit. Since these frames are transmitted periodically for measurement purposes, each transceiver can determine which potential transceivers are eligible for direct connections. If only the transceiver with the fixed-network access now sets an identification bit, the master station or base station can also be uniquely identified.

The algorithm/method also takes into account the possibility of the base station failing.

If the master station or base station is disconnected or fails for a different reason, then in principle the case of a network startup, as described above, occurs. Once the transceivers associated with the wireless network notice the loss of the base station, they will autonomously establish a new network.

BRIEF DESCRIPTION OF THE DRAWINGS

The various objects, advantages and novel features of the present disclosure will be more readily apprehended from the following Detailed Description when read in conjunction with the enclosed drawings, in which:

FIGS. 11, 13, 15 and 17 show a third auto-configuration scenario for achieving an optimal network performance and network illumination for a wireless, autonomous communications network with a fixed-network connection and comprising a single master station or base station, the master station or base station not holding the fixed-network connection at the start of the auto-configuration scenario;

FIGS. 12, 14, 16 and 18 show a fourth auto-configuration scenario for achieving an optimal network performance and network illumination for a wireless, autonomous communications network with a fixed-network connection and comprising a single master station or base station, the master station or base station holding the fixed-network connection at the start of the auto-configuration scenario;

FIG. 19 shows the structure of a transceiver with a fixed-network connection and of a master station or base station which communicate with one another as shown in FIG. 11;

FIG. 20 shows the structure of a master station or base station with a fixed-network connection and of a transceiver which communicate with one another as shown in FIG. 12;

FIG. 21 shows the structure of a master station or base station with a fixed-network connection and of a transceiver which communicate with one another as shown in FIGS. 12, 14 and 16; and FIG. 22 shows the structure of a transceiver with surrendered master-station or base-station functionality and fixed-network connection and of a transceiver with assumed master-station or base-station functionality which communicate with one another as shown in FIG. 18.

DETAILED DESCRIPTION

Figure 1:
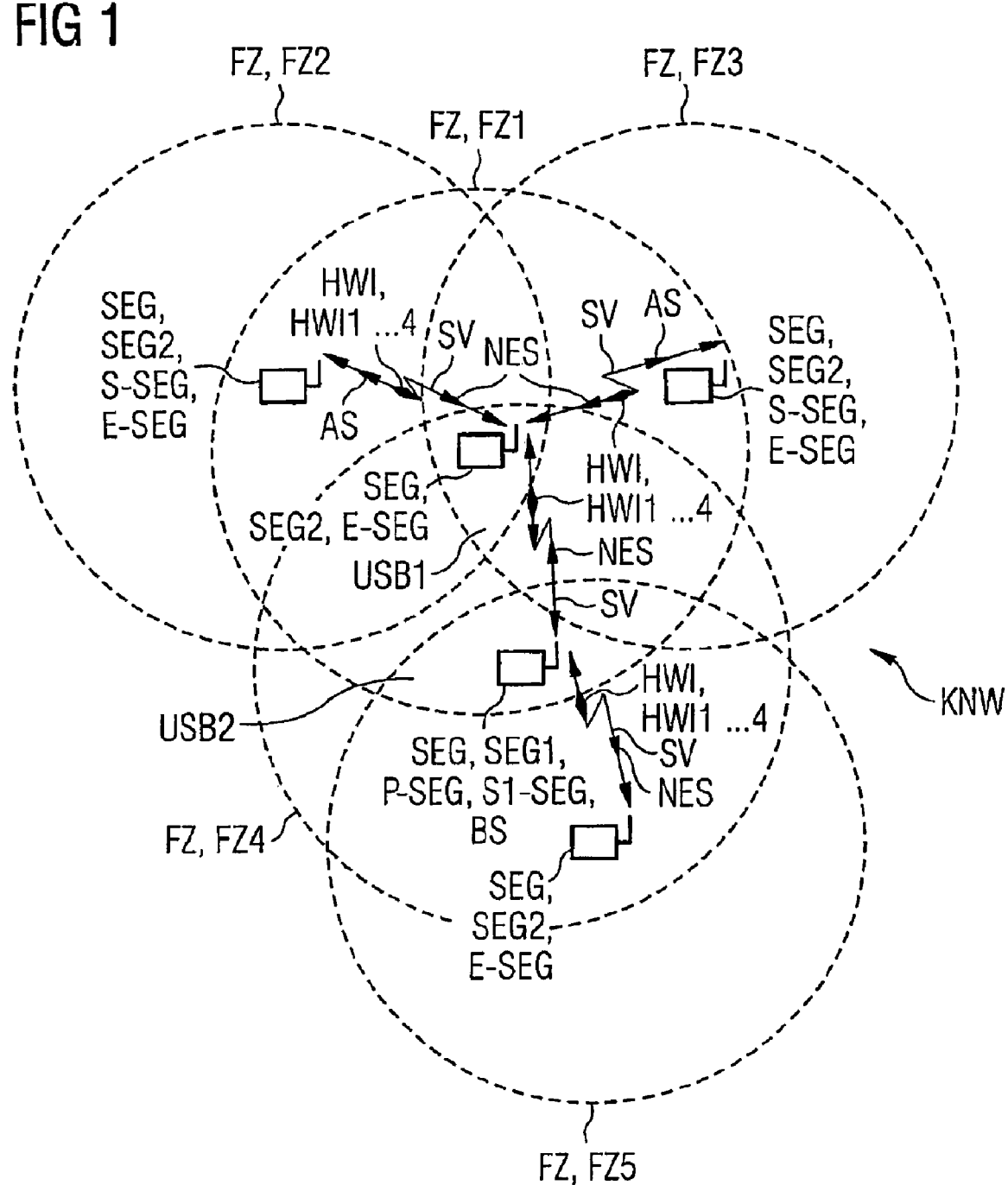
FIGS. 1 to 4 show a first auto-configuration scenario for achieving an optimal network performance and network illumination for a wireless, autonomous communications network with no fixed-network connection and comprising a single master station or base station at the start of the auto-configuration scenario wherein the scenario includes four auto-configuration phases for achieving an optimal network performance and network illumination for the wireless, autonomous communications network KNW.

The communications network KNW illustrated in FIG. 1 has five exemplary transceivers SEG which, each covering an idealized radio area called a radio cell FZ, are arranged so as to lie in the centre of the respective radio cell FZ such that the individual radio cells form a coherent radio coverage area of the communications network KNW, in which the transceivers SEG associated with the communications network KNW are connected to one another by radio either directly or indirectly via a transceiver and communicate with one another by means of wireless communication (transmission of signals). Signal traffic SV thus takes place. The signal traffic comprises here, inter alia, special broadcast messages transmitted in predetermined time frames.

The communications network KNW is operated preferably as a wireless local area network (WLAN) or as a DECT cordless telephone system, while the transceivers SEG can be configured e.g. as fixed and/or mobile devices.

The radio coverage area of the communications network KNW is formed in accordance with the representation in FIG. 1 from five radio cells FZ1 . . . FZ5, of which four of the five transceivers SEG are contained in a first radio cell FZ1. In this first radio cell FZ1 there is also located a first intersection area ÜSB1 of three radio cells adjacent to the first radio cell FZ1—a second radio cell FZ2, a third radio cell FZ3 and a fourth radio cell FZ4—in which intersection area one transceiver SEG of the four transceivers SEG is arranged.

In addition, the first radio cell FZ1 forms, with a fifth radio cell FZ5, a second intersection area ÜSB2 which is located in the fourth radio cell FZ4. The transceiver SEG corresponding to the fourth radio cell FZ4 is arranged in this second intersection area ÜSB2.

In a first phase of the auto-configuration scenario (at the start of the auto-configuration scenario) as shown in FIG. 1, an enhanced functionality, the master-station or base-station functionality, is allocated to a first transceiver SEG1 by the transceivers SEG assigned to the communications network KNW, while the remaining transceivers SEG, also called second transceivers SEG2, possess a device-specific basic functionality, although they also, like the first transceiver SEG1, are generally capable of taking over the master-station or base-station functionality. In accordance with the functionality assigned, the first transceiver SEG1 functions as master station or base station BS. From the viewpoint of the master station or base station BS, the second transceivers SEG2, which are located directly or indirectly within communication range of the master station or base station BS, are first transceivers E-SEG.

In accordance with FIG. 1, the transceiver SEG corresponding to the fourth radio cell FZ4 is the transceiver which, as first transceiver SEG1, holds the master-station or base-station functionality. The transceiver SEG of the fourth radio cell FZ4 can either have the functionality assigned to it by the operator of the communications network KNW or receive the functionality from the communications network KNW by means of a special assignment procedure.

This special assignment procedure will be explained below for the communications network KNW shown in FIG. 1.

In the communications network KNW, none of the associated transceivers SEG is aware of the existence of the respectively adjacent transceiver SEG or of the other transceivers SEG. Each transceiver SEG will therefore firstly determine whether transceivers SEG are present in its vicinity or whether a communications network KNW already even exists. If in the process it establishes that there is no adjacent transceiver SEG, then it will of its own accord start to establish a communications network. This is done by the transceiver concerned SEG emitting a network existence signal NES as a broadcast signal. If an adjacent transceiver SEG receives the emitted network existence signal NES, then the receiving transceiver SEG itself refrains from emitting a network existence signal NES. If the transceiver SEG receiving the network existence signal NES receives the network existence signal NES only once—in this case the transceiver SEG transmitting the network existence signal NES is a primary transceiver P-SEG, then from the viewpoint of the receiving transceiver SEG, the primary transceiver P-SEG holds the enhanced functionality, i.e. the master-station or base-station functionality, and is consequently the first transceiver SEG1 which functions as a base station BS.

This case is represented in FIG. 1 by the transceivers SEG in the fourth radio cell FZ4 and the fifth radio cell FZ5. The transceiver SEG in the fourth radio cell FZ4 broadcasts the network existence signal NES. This network existence signal NES can in accordance with the radio coverage area of the communications network KNW be received both by the transceiver SEG in the first radio cell FZ1 and by the transceiver SEG in the fifth radio cell FZ5. While the transceiver SEG in the first radio cell FZ1 receives the network existence signal NES from multiple adjacent transceivers SEG, the transceiver in the fifth radio cell FZ5 receives the network existence signal NES just once, from the transceiver SEG in the fourth radio cell FZ4. The transceiver SEG in the fourth radio cell FZ4 is consequently from the viewpoint of the transceiver SEG in the fifth radio cell FZ5 the previously mentioned primary transceiver P-SEG. The extent to which this primary transceiver P-SEG in the fourth radio cell FZ4 now also holds the master-station or base-station functionality and consequently is the first transceiver SEG1 depends ultimately on how the transceiver SEG in the first radio cell FZ1, which has also received the network existence signal NES transmitted by the primary transceiver P-SEG in the fourth radio cell FZ4, behaves in relation to this network reception signal NES.

If a transceiver SEG receiving the network existence signal NES, such as the transceiver SEG in the first radio cell FZ1, receives such a network existence signal NES respectively from multiple transceivers SEG, secondary transceivers S-SEG, instead of from one transceiver SEG, the primary transceiver P-SEG,—in FIG. 1 these are the transceivers SEG in the second radio cell FZ2, the third radio cell FZ3 and the fourth radio cell FZ4—then the transceiver SEG receiving the various network existence signals NES in the first radio cell FZ1 transmits either to all the secondary transceivers S-SEG or to all the secondary transceivers S-SEG with the exception of a first secondary transceiver S1-SEG an instruction signal AS, by means of which the secondary transceiver S-SEG concerned is respectively instructed to discontinue emitting the network existence signal NES.

In the first-mentioned case, the transceiver SEG receiving the network existence signals NES would then be the first transceiver SEG1 which holds the master-station or base-station functionality. In the last-mentioned case, by contrast, the first secondary transceiver S1-SEG which did not receive the instruction signal AS would be the first transceiver SEG1 which holds the master-station or base-station functionality.

According to FIG. 1, the instruction signal AS is transmitted by the transceiver SEG in the first radio cell FZ1 to the transceivers SEG in the second radio cell FZ2 and the third radio cell FZ3, while the transceiver SEG in the fourth radio cell FZ4 does not receive the instruction signal AS. The transceiver SEG in the fourth radio cell FZ4 is thus simultaneously primary transceiver P-SEG (from the viewpoint of the transceiver SEG in the fifth radio cell FZ5) and first secondary transceiver S1-SEG (from the viewpoint of the transceiver SEG in the first radio cell FZ1) and consequently ultimately the first transceiver SEG1 which, according to the assignment procedure, also holds the master-station or base-station functionality and thus functions as a base station BS.

In addition, in the first phase of the first auto-configuration scenario, at least one portion of the signal traffic SV of transceivers SEG located within communication range of the measuring transceiver SEG is recorded by each transceiver SEG, both by the first transceiver SEG1 and by the second transceivers SEG2 at regular time intervals during a measurement phase. With the aid of this recorded signal traffic SV, the receivability of the transceivers SEG is determined and four advisory information items HWI about the overall transceivers SEG received are generated and stored by each transceiver SEG respectively.

Thus, a first advisory information HWI1 by means of which the number of transceivers SEG received is specified, a second advisory information HWI2 which specifies the quality of the reception with which the received transceivers SEG are respectively received, a third advisory information HWI3 by means of which the existence of a privileged transceiver SEG among the transceivers received SEG, and a fourth advisory information HWI4 by means of which the device types of the transceivers SEG received is specified are generated and stored.

Alternatively, it is also possible to generate and to store fewer or more than four advisory information items HWI. Thus, it is, for example, possible to restrict oneself only to the first advisory information HWI1.

Figure 2:
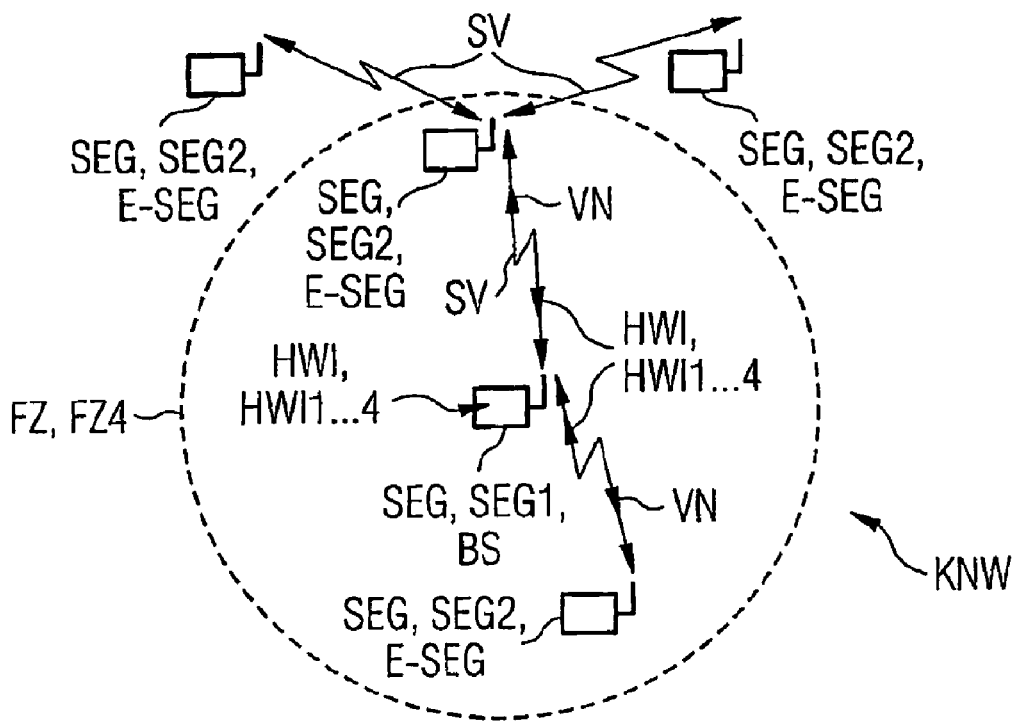

In a second phase of the first auto-configuration scenario according to FIG. 2, in which only the five transceivers SEG and the fourth radio cell FZ4 are shown from the communications network KNW in FIG. 1, a distribution message VN is emitted by the transceiver SEG with the master-station or base-station functionality in the fourth radio cell FZ4, the first transceiver SEG1, by means of which distribution message the second transceivers SEG2 which can receive this distribution message are respectively requested to transmit the advisory information HWI1 . . . HWI4 generated by these devices to the first transceiver SEG1. The second transceivers SEG2 which are prompted in this regard are the two transceivers SEG that are also located or residing in the fourth radio cell FZ4 which correspond to the first radio cell FZ1 and fifth radio cell FZ5 shown in FIG. 1. After receiving the distribution message VN, the prompted second transceivers SEG2 transmit their generated advisory information HWI . . . HWI4 to the first transceiver SEG1. The first transceiver SEG1 subsequently determines, with the aid of the advisory information HWI1 . . . HWI4 auto-generated and transmitted by the said second transceivers SEG2, which of the named second transceivers SEG2 is best suited in comparison with the first transceiver SEG1 to take over the master-station or base-station functionality from the first transceiver SEG1.

Figure 3:
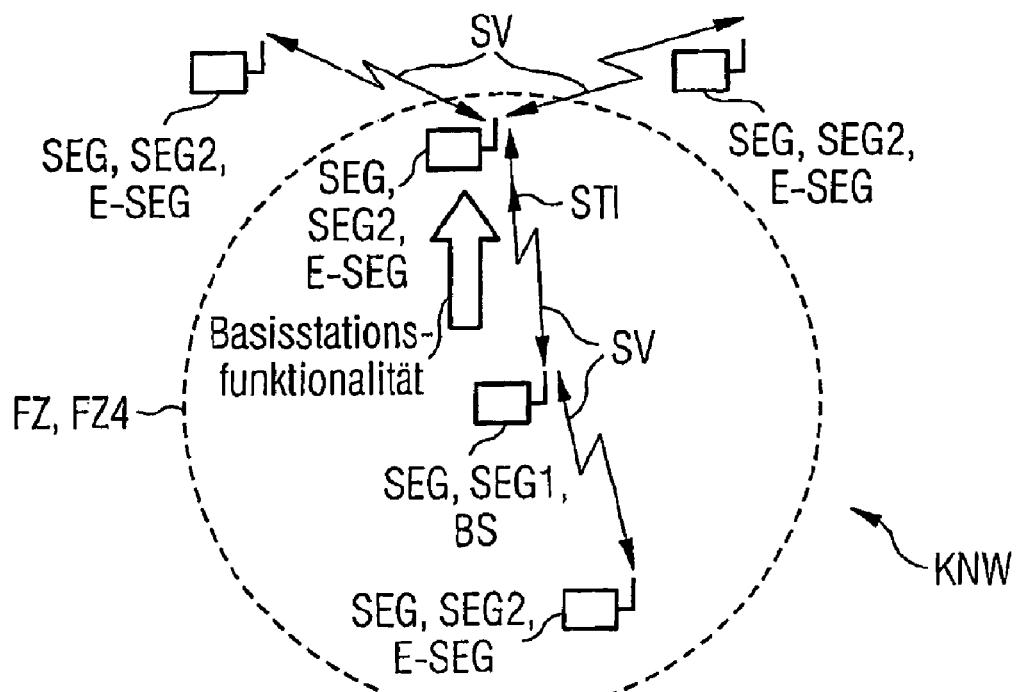

A third phase of the first auto-configuration scenario is shown in FIG. 3 in which, as in FIG. 2, again only the five transceivers SEG and the fourth radio cell FZ4 are shown from the communications network KNW in FIG. 1, a control information STI is generated by the transceiver SEG with the master-station or base-station functionality in the fourth radio cell FZ4, the first transceiver SEG1, once it has, in accordance with FIG. 2, evaluated its own and received advisory information HWI1 . . . HWI4 and determined the second transceiver SEG2 best suited for taking over the functionality and has transmitted this control information to this best suited second transceiver SEG2, the transceiver SEG corresponding according to FIG. 1 to the first radio cell FZ1. The second transceiver SEG2 corresponding to the first radio cell FZ1 is located, like the first transceiver SEG1, in the fourth radio cell, which is why the control information STI can be transmitted directly. By means of the control information STI, the second transceiver SEG2 corresponding to the first radio cell is informed that it is to take over the master-station or base-station functionality.

It should be mentioned at this point for form's sake that the emission of control information STI by the first transceiver SEG1 is waived if none of the second transceivers SEG2 is better suited in comparison with the first transceiver SEG1.

Figure 4:
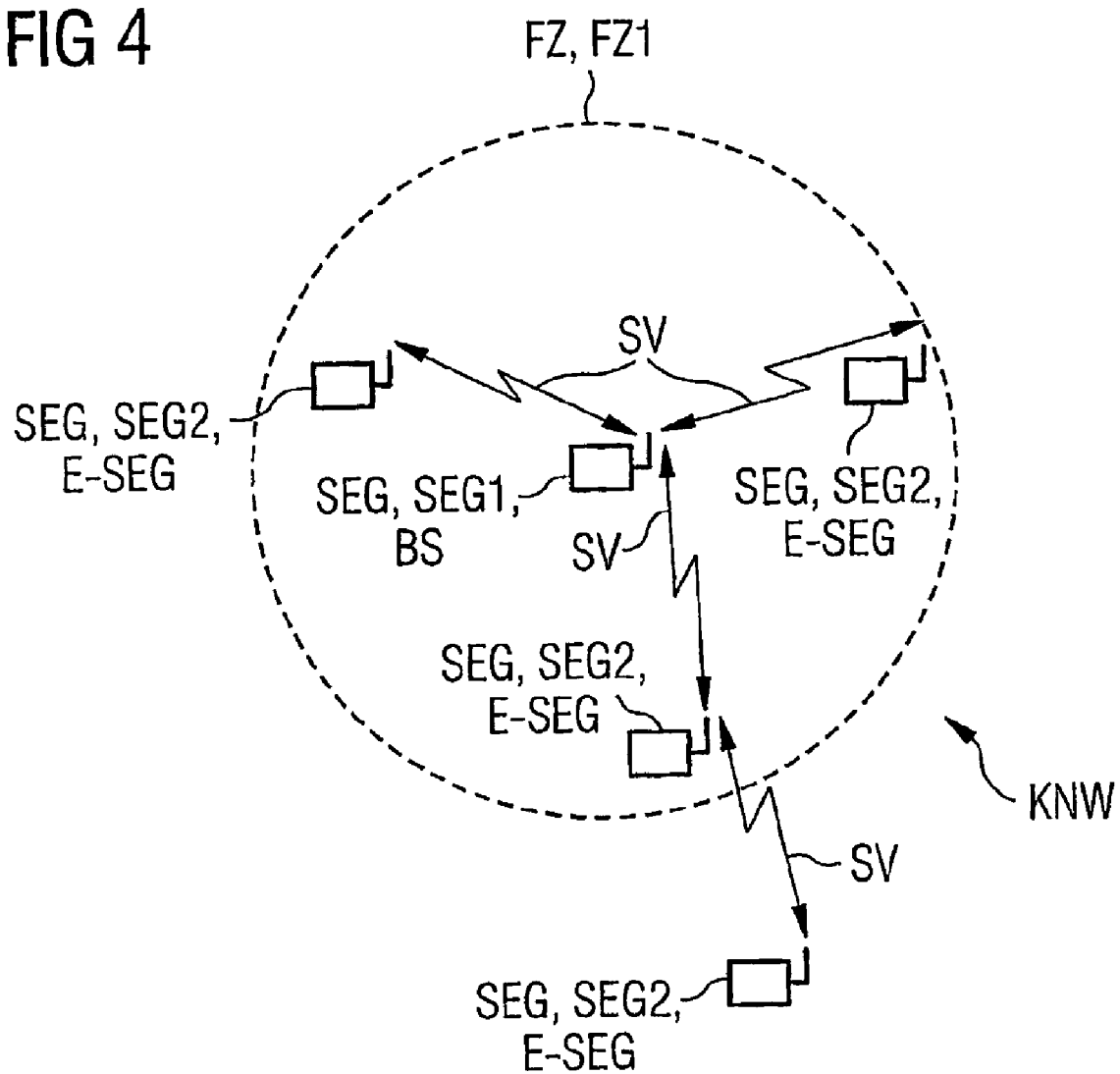

A fourth phase of the first auto-configuration scenario is illustrated in FIG. 4, in which only the five transceivers SEG and the first radio cell FZ1 are shown from the communications network KNW in FIG. 1. In the fourth phase, there is a changeover in the transceiver SEG that holds the master-station or base-station functionality. The master-station or base-station functionality passes from the transceiver SEG of the fourth radio cell FZ4, the previous first transceiver SEG1 (cf. FIGS. 1 to 3), to the transceiver SEG corresponding to the first radio cell FZ1, the new first transceiver SEG1.

The auto-configuration phases represented and described in FIGS. 1 to 4 can be repeated at any time. In this way, changes in the communications network, e.g. in terms of the number of associated transceivers, can be responded to flexibly for the purposes of a dynamic adaptation, and an optimal network performance and network illumination always achieved.

FIGS. 5 to 10 show a second auto-configuration scenario, including, as in the first scenario, of four auto-configuration phases, for achieving an optimal network performance and network illumination for a wireless, autonomous communications network with no fixed-network connection and comprising two master stations or base stations at the start of the auto-configuration.

The communications network KNW again has five transceivers SEG which, each covering an idealized radio area, called a radio cell FZ, are arranged so as to lie in the center of the respective radio cell FZ such that the individual radio cells form a coherent radio coverage area of the communications network KNW, in which the transceivers SEG associated with the communications network KNW are again connected to one another by radio either directly or indirectly via a transceiver and communicate with one another by means of wireless communication (transmission of signals). Thus, signal traffic SV again takes place. Once again, the signal traffic here comprises, inter alia, special broadcast messages transmitted in predetermined time frames.

The communications network KNW is again preferably operated as a wireless local area network (WLAN) or as a DECT cordless telephone system, while the transceivers SEG can be configured as fixed and/or mobile devices.

The radio coverage area of the communications network KNW is again formed of five radio cells FZ1 . . . FZ5, of which four of the five transceivers SEG are again contained in a first radio cell FZ1. Furthermore, there is again located in this first radio cell FZ1 a first intersection area ÜSB1 of again three radio cells adjacent to the first radio cell FZ1—a second radio cell FZ2, a third radio cell FZ3 and a fourth radio cell FZ4—in which one transceiver SEG of the four transceivers SEG is arranged.

In addition, the first radio cell FZ1 again forms with a fifth radio cell FZ5 a second intersection area ÜSB2, which is located in the fourth radio cell FZ4.

The transceiver SEG corresponding to the fourth radio cell FZ4 is again arranged in this second intersection area ÜSB2.

Figure 5:
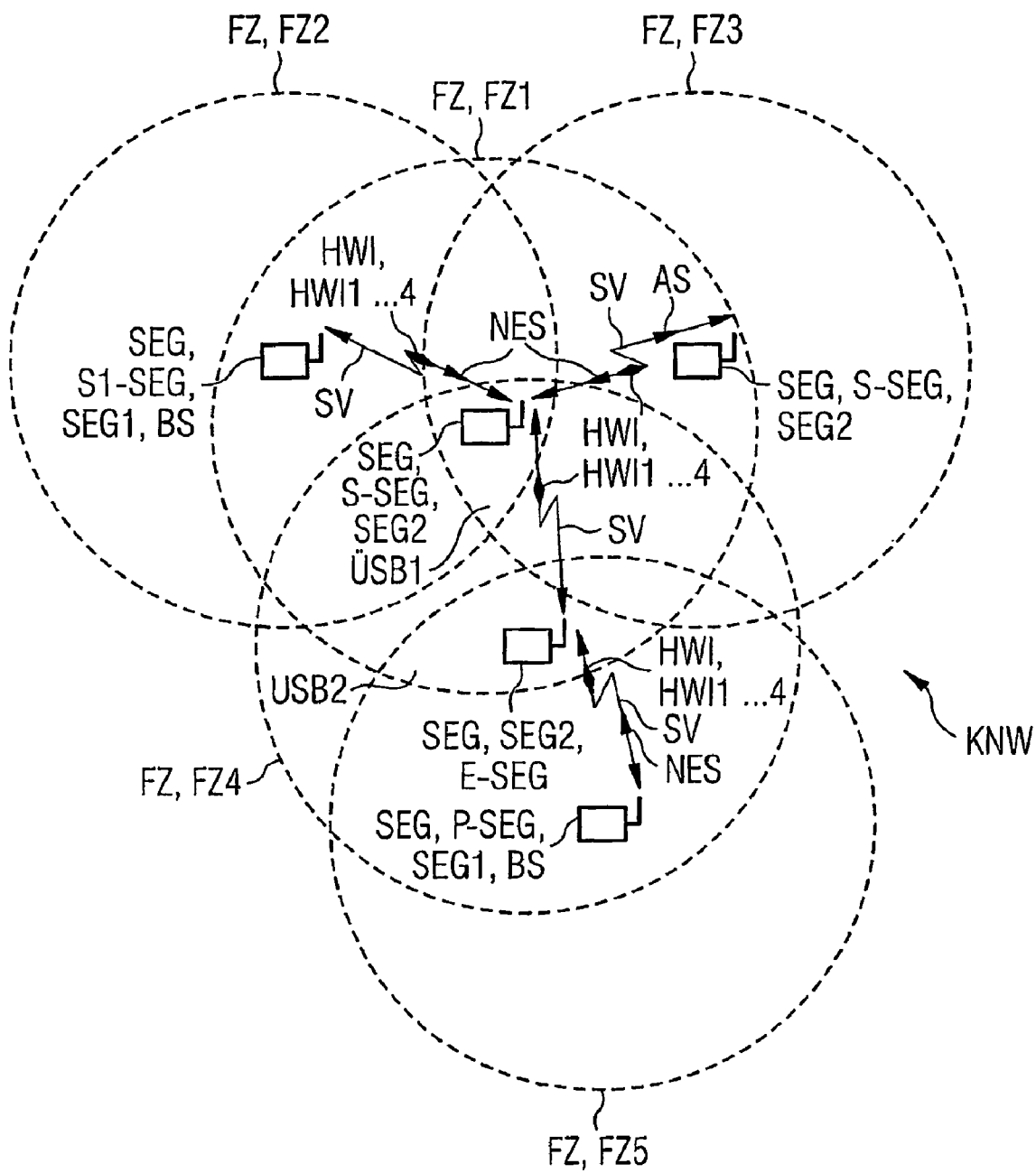
FIGS. 5 to 10 show a second auto-configuration scenario for achieving an optimal network performance and network illumination for a wireless, autonomous communications network with no fixed-network connection and comprising two master stations or base stations at the start of the auto-configuration scenario.

In a first phase of the auto-configuration scenario (at the start of the auto-configuration scenario) according to FIG. 5, two first transceivers SEG1 of the transceivers SEG assigned to the communications network KNW are assigned an enhanced functionality, the master-station or base-station functionality, while the remaining transceivers SEG, also called second transceivers SEG2, hold a device-specific basic functionality, although they also, like the first transceiver SEG1, are generally capable of taking over the master-station or base-station functionality. According to the functionality assigned, the first transceiver SEG1 functions as a master station or base station BS. From the viewpoint of the master station or base station BS, the second transceivers SEG2, which are located directly or indirectly within communication range of the master station or base station BS, are first transceivers E-SEG.

According to FIG. 5, the transceivers SEG corresponding to the second radio cell FZ2 and the fifth radio cell FZ5 are the transceivers which, as first transceivers SEG1, hold the master-station or base-station functionality. The transceivers SEG of the second and fifth radio cells FZ2, FZ5 can either have the functionality assigned to it by the operator of the communications network KNW or receive it from the communications network KNW by means of a special assignment procedure.

This special assignment procedure will be explained below for the communications network KNW shown in FIG. 5:

In the communications network KNW, none of the associated transceivers SEG is again aware of the existence of the respectively adjacent transceiver SEG or of the other transceivers SEG. Each transceiver SEG will therefore again determine firstly whether transceivers SEG are present in its vicinity or whether a communications network KNW already even exists. If in the process it establishes that there is no adjacent transceiver SEG, then it will again of its own accord start to establish a communications network. This is done by the transceiver concerned SEG emitting a network existence signal NES as a broadcast signal. If an adjacent transceiver SEG receives the emitted network existence signal NES, then the receiving transceiver SEG itself again refrains from emitting a network existence signal NES. If the transceiver SEG receiving the network existence signal NES receives the network existence signal NES only once—in this case the transceiver SEG transmitting the network existence signal NES is a primary transceiver P-SEG, then from the viewpoint of the receiving transceiver SEG the primary transceiver P-SEG holds the enhanced functionality, i.e. the master-station or base-station functionality, according to the assignment procedure, and is consequently the first transceiver SEG1 that functions as a base station BS.

This case is represented in FIG. 5 by the transceivers SEG in the fourth radio cell FZ4 and the fifth radio cell FZ5. The transceiver SEG in the fifth radio cell FZ5 broadcasts the network existence signal NES. This network existence signal NES can in accordance with the radio coverage area of the communications network KNW be received only by the transceiver SEG in the fourth radio cell FZ4. The transceiver SEG in the fourth radio cell FZ4, since it receives no network existence signal NES from the likewise adjacent transceiver SEG in the first radio cell FZ1, receives the network existence signal NES only once, from the transceiver SEG in the fifth radio cell FZ5. The transceiver SEG in the fifth radio cell FZ5 is consequently, from the viewpoint of the transceiver SEG in the fourth radio cell FZ4, the previously mentioned primary transceiver P-SEG, which moreover also already holds the master-station or base-station functionality and is consequently the first transceiver SEG1, because there is neither a further transceiver SEG adjacent to the transceiver SEG in the fifth radio cell FZ5 nor has the transceiver SEG in the first radio cell FZ1 transmitted a network existence signal NES to the transceiver SEG in the fourth radio cell FZ4.

If a transceiver SEG receiving the network existence signal NES—according to FIG. 5 this is the transceiver SEG in the first radio cell FZ1—receives a network existence signal NES respectively from multiple transceivers SEG, secondary transceivers S-SEG, instead of from one transceiver SEG, the primary transceiver P-SEG—in FIG. 5 these are the transceivers SEG in the second radio cell FZ2 and the third radio cell FZ3—then the transceiver SEG receiving the various network existence signals NES in the first radio cell FZ1 again transmits either to all the secondary transceivers S-SEG or to all the secondary transceivers S-SEG with the exception of a first secondary transceiver S1-SEG an instruction signal AS, by means of which the secondary transceiver S-SEG concerned is instructed respectively to discontinue emitting the network existence signal NES.

In the first-mentioned case, the transceiver SEG receiving the network existence signals NES would then be the first transceiver SEG1 which holds the master-station or base-station functionality. In the last-mentioned case, by contrast, the first secondary transceiver S1-SEG which did not receive the instruction signal AS would be the first transceiver SEG1 which holds the master-station or base-station functionality.

According to FIG. 5, the instruction signal AS is transmitted by the transceiver SEG in the first radio cell FZ1 to the transceiver SEG in the third radio cell FZ3, while the transceiver SEG in the second radio cell FZ2 does not receive the instruction signal AS. The transceiver SEG in the second radio cell FZ2 is thus first secondary transceiver S1-SEG (from the viewpoint of the transceiver SEG in the first radio cell FZ1) which, alongside the transceiver SEG in the fifth radio cell FZ5, according to the assignment procedure holds the master-station or base-station functionality and thus functions as a base station BS.

In addition, in the first phase of the second auto-configuration scenario, at least one portion of the signal traffic SV of transceivers SEG located within communication range of the measuring transceiver SEG is again recorded by each transceiver SEG, both by the first transceiver SEG1 and by the second transceivers SEG2, at regular time intervals during a measurement phase. With the aid of this recorded signal traffic SV, the receivability of the transceivers SEG is again determined and four advisory information items HWI about the overall transceivers SEG received are again generated and stored by each transceiver SEG respectively.

Thus, a first advisory information HWI1 by means of which the number of transceivers SEG received is specified, a second advisory information HWI2 which specifies the quality of the reception with which the received transceivers SEG are respectively received, a third advisory information HWI3 by means of which the existence of a privileged transceiver SEG among the transceivers received SEG is specified, and a fourth advisory information HWI4 by means of which the device types of the transceivers SEG received are specified, are again generated and stored.

Alternatively, it is also possible to generate and to store fewer or more than four advisory information items HWI. Thus, it is, for example, possible to restrict oneself only to the first advisory information HWI1.

Figure 6:
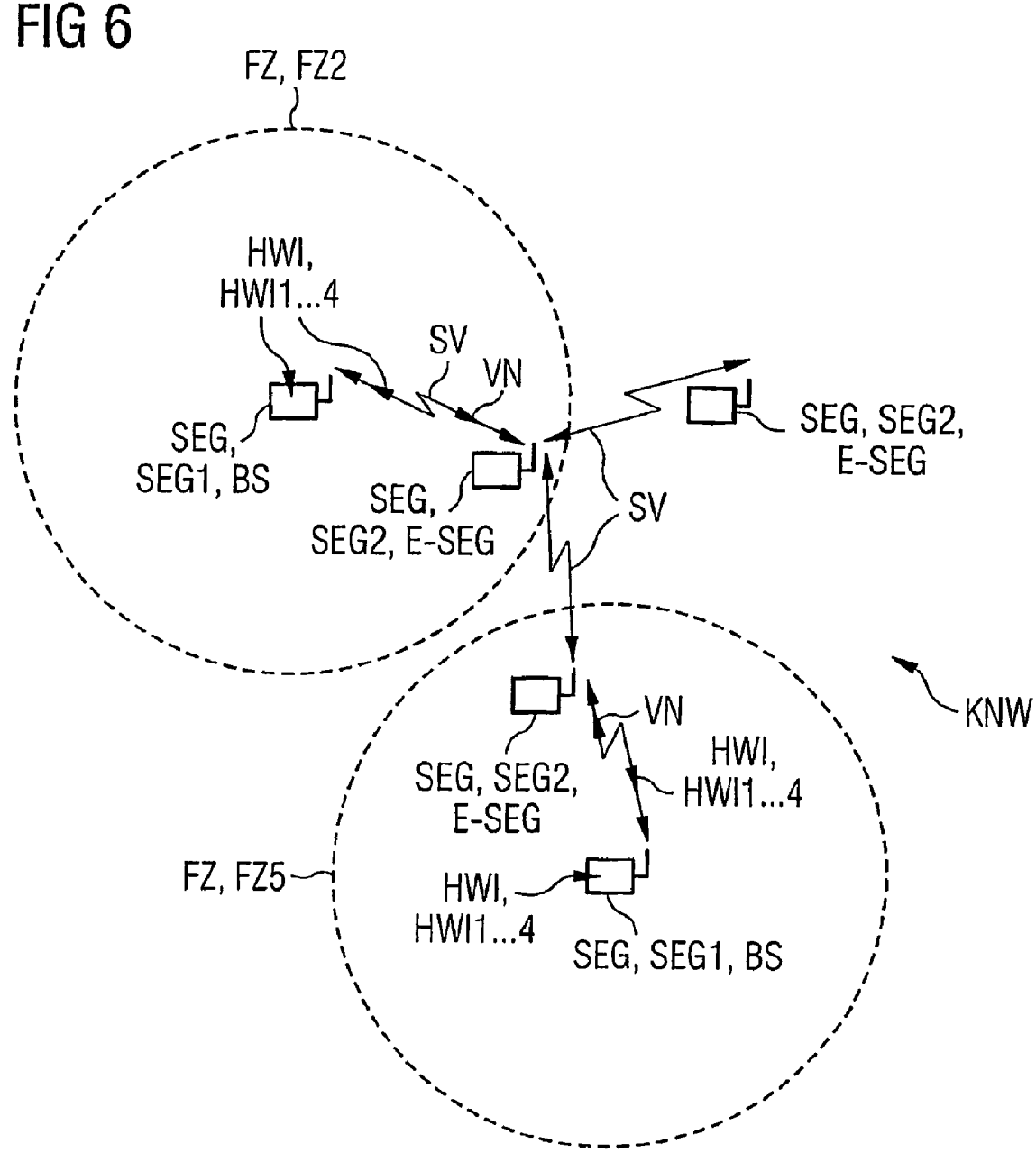

In a second phase of the second auto-configuration scenario according to FIG. 6, in which only the five transceivers SEG, the second radio cell FZ2 and the fifth radio cell FZ5 are shown from the communications network KNW in the FIGURE, a distribution message VN is emitted respectively by the transceivers SEG with the master-station or base-station functionality in the second and fifth radio cells FZ2 and FZ5, the first transceivers SEG1, by means of which distribution message the second transceivers SEG2 which can receive this distribution message are respectively prompted to transmit the advisory information HWI1 ... HWI4 generated by these devices to the respective first transceiver SEG1. The second transceivers SEG2 which are respectively prompted in this regard are, with regard to the second radio cell FZ2, the transceiver SEG also located or residing in this radio cell and corresponding to the first radio cell FZ1, and with regard to the fifth radio cell FZ2, the transceiver SEG also located or residing in this radio cell and corresponding to the fourth radio cell FZ1. After receiving the distribution message VN, the respectively prompted second transceivers SEG2 transmit their generated advisory information items HWI1 ... HWI4 to the respective first transceiver SEG1 in the second and fifth radio cells FZ2, FZ5. The two first transceivers SEG1 subsequently determine, with the aid of the advisory information HWI1 ... HWI4 auto-generated respectively and transmitted respectively by the said second transceivers SEG2, whether the respectively concerned second transceiver SEG2 is better suited in comparison with the respective first transceiver SEG1 to take over the master-station or base-station functionality from the respective first transceiver SEG1.

Figure 7:
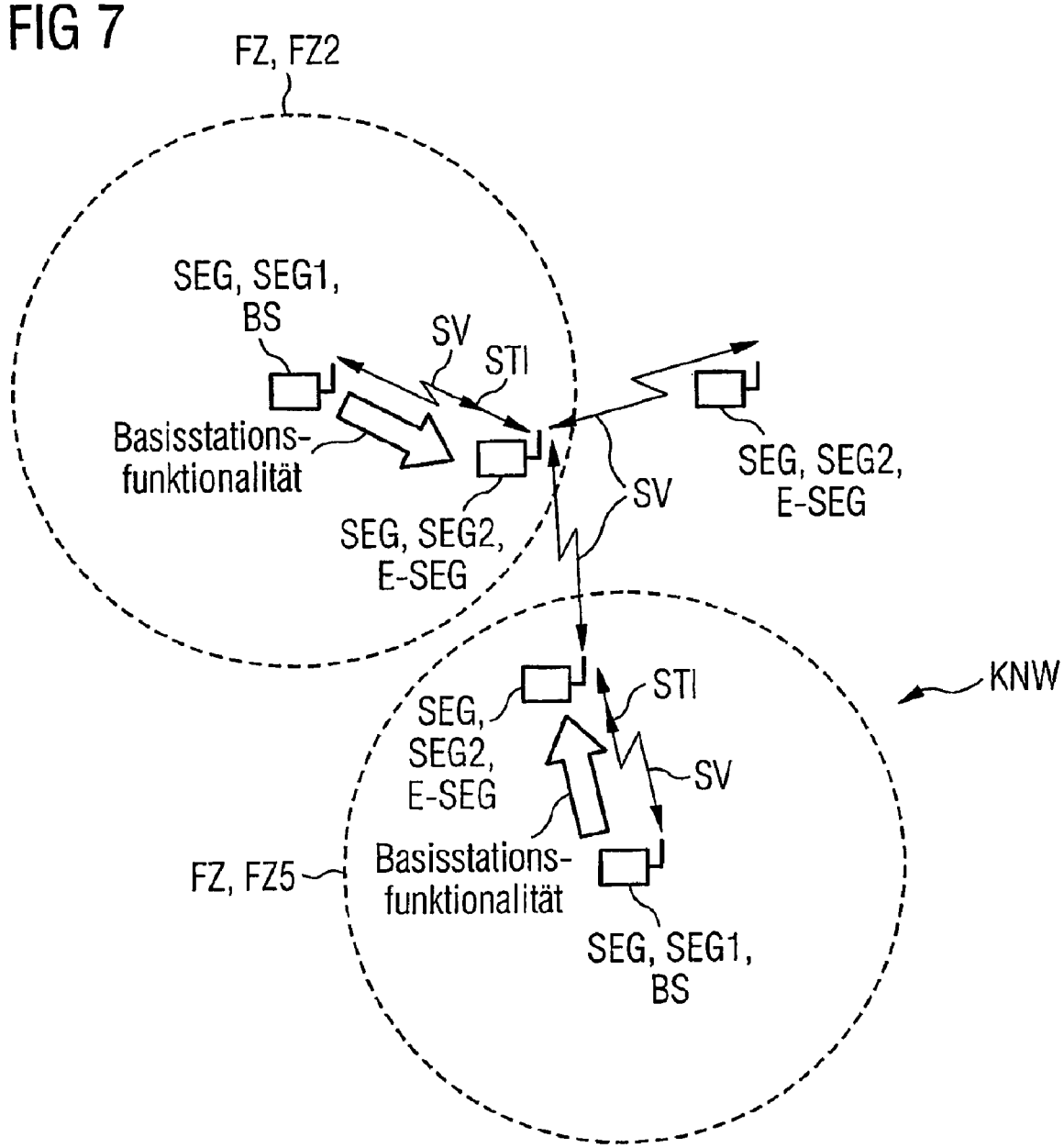

In a third phase of the second auto-configuration scenario according to FIG. 7 in which, as in FIG. 6, again only the five transceivers SEG, the second radio cell FZ2 and the fifth radio cell FZ5 are shown from the communications network KNW in FIG. 5, a control information STI is generated respectively by the transceivers SEG with the master-station or base-station functionality in the second and fifth radio cells FZ2, FZ5, the first transceivers SEG1, once these have, in accordance with FIG. 6, evaluated their own and received advisory information HWI1 ... HWI4 and determined respectively the second transceiver SEG2 best suited for taking over the functionality, and has respectively transmitted this control information to the respectively best suited second transceiver SEG2, the transceiver SEG corresponding according to FIG. 5 to the first radio cell FZ1 or the transceiver SEG corresponding according to FIG. 5 to the fourth radio cell FZ4. The second transceiver SEG2 corresponding to the first radio cell FZ1 is, like the first transceiver SEG1, located in the second radio cell FZ2 while the second transceiver SEG2 corresponding to the fourth radio cell FZ4 is, like the first transceiver SEG1, located in the fifth radio cell FZ5, so the control information STI can respectively be transmitted directly. By means of the control information STI, the second transceiver SEG2 corresponding to the first radio cell FZ1 and the second transceiver SEG2 corresponding to the fourth radio cell FZ4 are respectively informed that it is to take over the master-station or base-station functionality.

It should be mentioned at this point for form's sake that the emission of control information STI by the respective first transceiver SEG1 is waived if none of the second transceivers SEG2 is better suited in comparison with the respective first transceiver SEG1.

Figure 8:
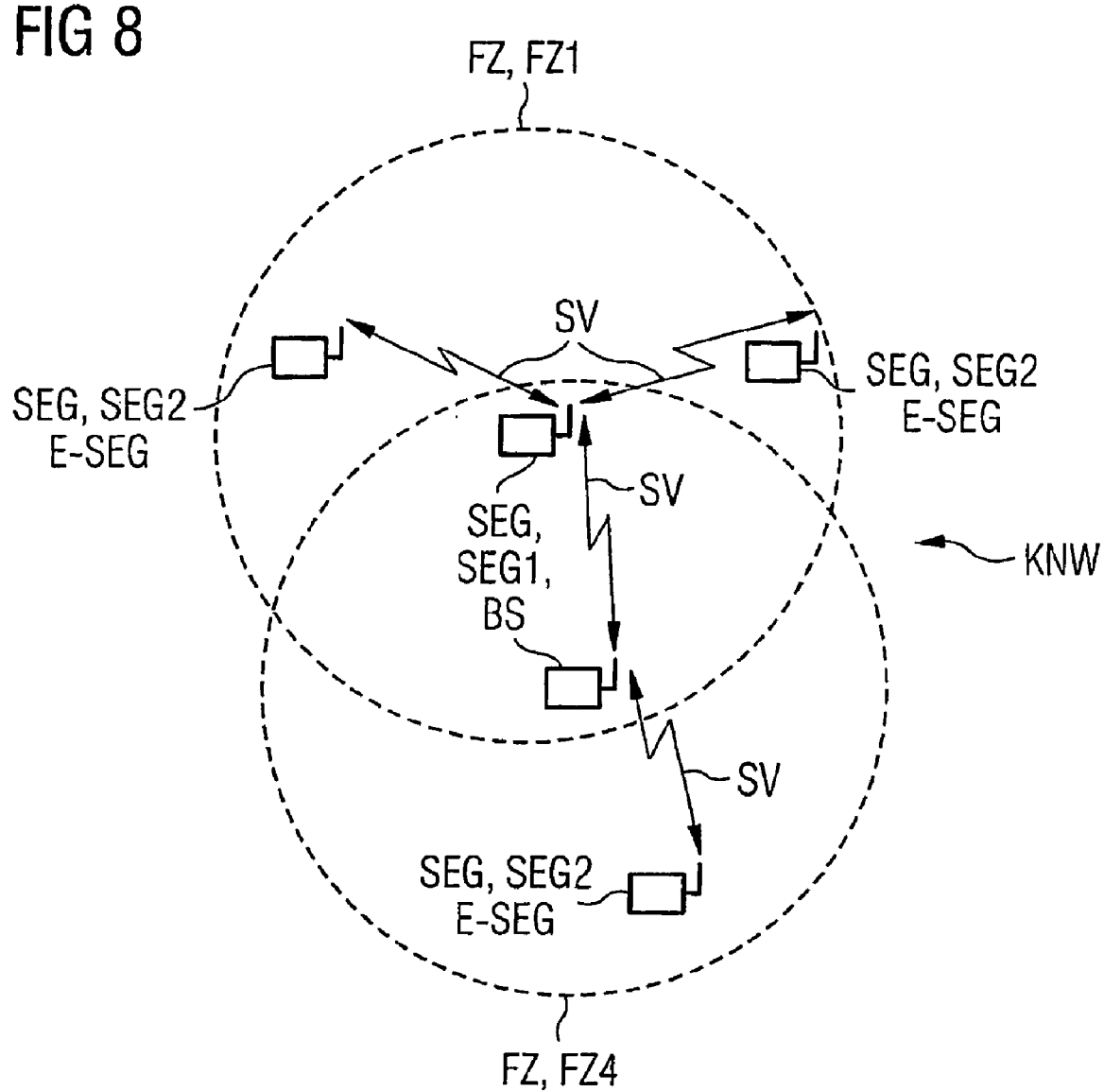

In a fourth phase of the second auto-configuration scenario according to FIG. 8, in which only the five transceivers SEG, the first radio cell FZ1 and the fourth radio cell FZ4 are shown from the communications network KNW in FIG. 5, there is a changeover in both the transceivers SEG that hold the master-station or base-station functionality. The master-station or base-station functionality passes both from the transceiver SEG of the second radio cell FZ2, the previous first transceiver SEG1 (cf. FIGS. 5 to 7), to the transceiver SEG corresponding to the first radio cell FZ1, the new first transceiver SEG1 and from the transceiver SEG of the fifth radio cell FZ5, the previous first transceiver SEG1 (cf. FIGS. 5 to 7), to the transceiver SEG corresponding to the fourth radio cell FZ4, the new first transceiver SEG1.

The auto-configuration phases illustrated in the exemplary embodiments of FIGS. 5 to 8 can be repeated at any time. In this way, changes in the communications network, e.g. in terms of the number of associated transceivers, can be responded to flexibly for the purposes of a dynamic adaptation, and an optimal network performance and network illumination always achieved.

In addition to this, the configuration of the communications network KNW comprising the two master station or base stations BS represented in FIG. 8 can also be simplified or optimized to the effect that there is only a single master station or base station BS for the entire communications network. For this purpose, either (case I) the first transceiver SEG1 in the fourth radio cell FZ4 that is functioning as a master station or base station hands over the master-station or base-station functionality which it has just obtained to the first transceiver SEG1 in the first radio cell FZ1 that is also functioning as a master station or base station or (case II) the first transceiver SEG1 in the first radio cell FZ1 that is functioning as a master station or base station hands over the master-station or base-station functionality which it has just obtained to the first transceiver SEG1 in the fourth radio cell FZ4 that is also functioning as a master station or base station.

Figure 9:
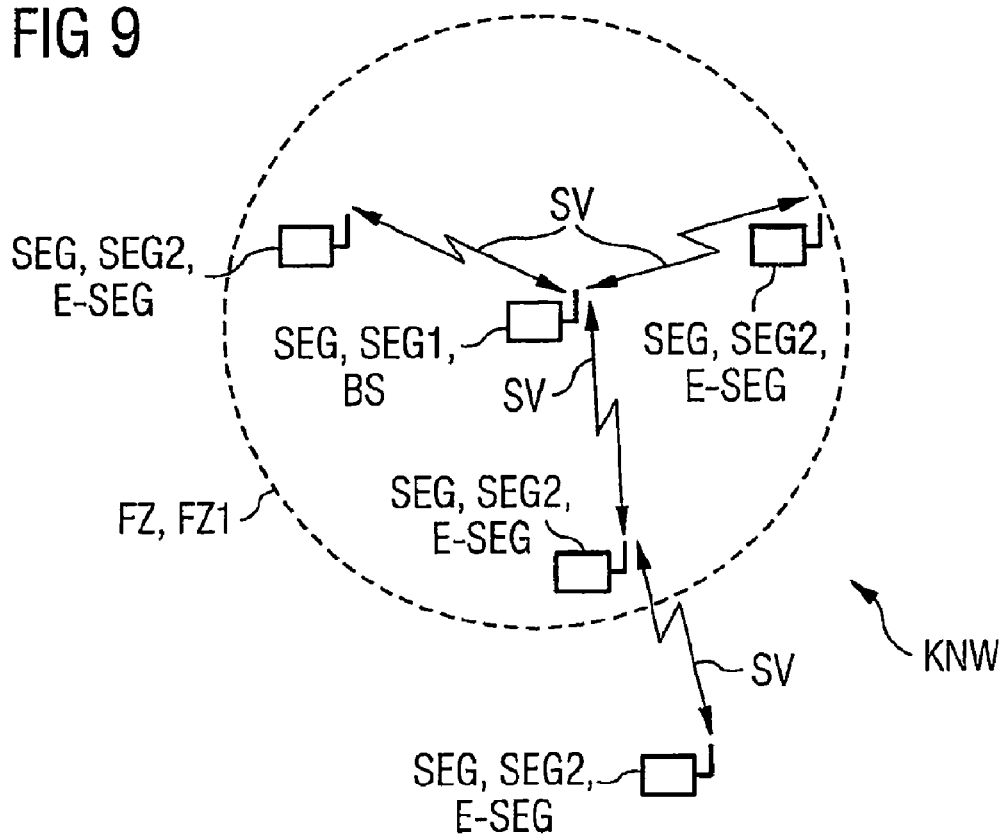
Figure 10:
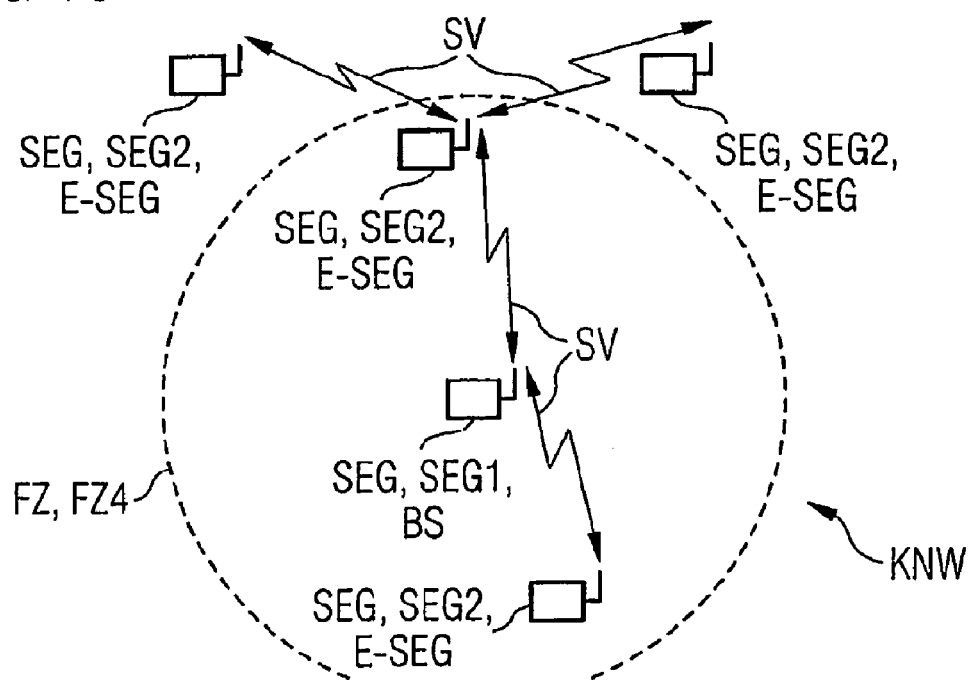

In case I, a configuration of the communications network KNW as represented in FIG. 9 applies while in case II a configuration of the communications network KNW as represented in FIG. 10 applies. The representation of the communications network KNW in FIG. 9 corresponds to the network representation in FIG. 4 which shows the fourth phase of the first auto-configuration scenario. By contrast, the representation of the communications network KNW in FIG. 10 corresponds to the basic state of the network representation in FIG. 2 which shows the second phase of the first auto-configuration scenario, with the exception of the transmission shown there of the distribution message VN and of the advisory information HWI1 ... HWI4.

In other words:

If in FIG. 10, as in FIG. 2, the transmission shown there of the distribution message VN and of the advisory information HWI1 . . . HWI4 arises, then an exact match between the two FIGURES is also provided in case II.

Consequently, in both cases, in the course of the simplification mentioned above, the second auto-configuration scenario has been returned to the first auto-configuration scenario.

FIGS. 11, 13, 15, 17 show a third auto-configuration scenario, again consisting of four auto-configuration phases, for achieving an optimal network performance and network illumination for a wireless, autonomous communications network KNW with a fixed-network connection and comprising a single master station or base station, the master station or base station holding no fixed-network connection at the start of the auto-configuration.

The communications network KNW again has five transceivers SEG which, each covering an idealized radio area, called a radio cell FZ, are again arranged in relation to one another so as to lie in the center of the respective radio cell FZ such that the individual radio cells form a coherent radio coverage area of the communications network KNW, in which the transceivers SEG associated with the communications network KNW are connected to one another by radio either directly or indirectly via a transceiver and communicate with one another by means of wireless communication (transmission of signals). Signal traffic SV thus again takes place. Once again, the signal traffic here comprises, inter alia, special broadcast messages transmitted in predetermined time frames.

The communications network KNW is operated preferably as a wireless local area network (WLAN) or as a DECT cordless telephone system, while the transceivers SEG can be configured as fixed and/or mobile devices.

The radio coverage area of the communications network KNW is, according to the representation in FIG. 11, again formed from five radio cells FZ1 . . . FZ5, of which all five transceivers SEG are contained in a first radio cell FZ1. In this first radio cell FZ1 there is also located a third intersection area ÜSB3 of four radio cells adjacent to the first radio cell FZ1—a second radio cell FZ2, a third radio cell FZ3, a fourth radio cell FZ4 and a fifth radio cell FZ5—in which intersection area one transceiver SEG of the four transceivers SEG is arranged.

The first radio cell FZ1 forms in addition a fourth intersection area ÜSB4 with the fourth and fifth radio cell FZ4, FZ5, which intersection area is also located in the first radio cell FZ1. In this fourth intersection area ÜSB4, there are arranged the transceiver SEG corresponding to the first radio cell FZ1, the transceiver SEG corresponding to the fourth radio cell FZ4 and the transceiver SEG corresponding to the fifth radio cell FZ5.

Figure 11:
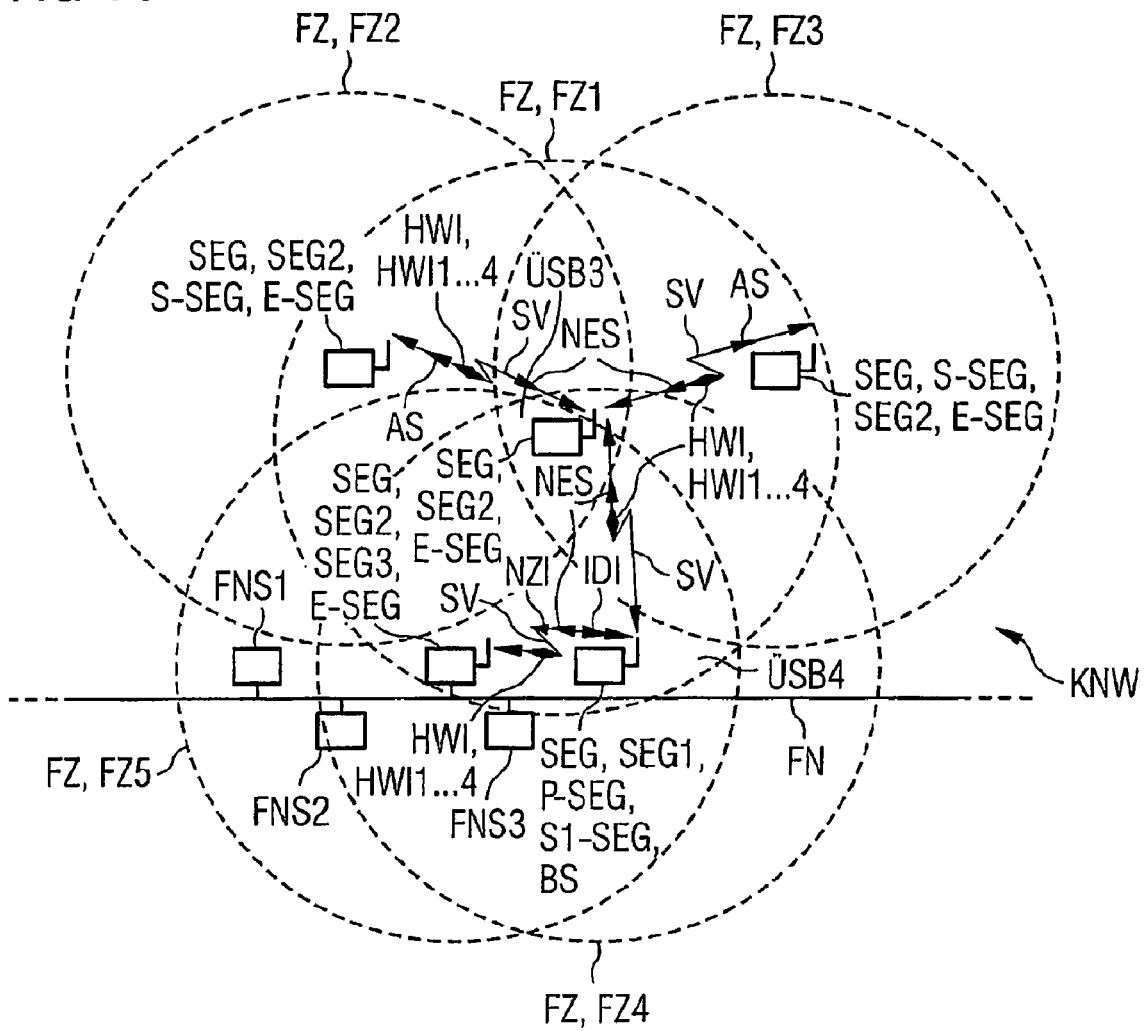

In a first phase of the third auto-configuration scenario (at the start of the auto-configuration scenario) according to FIG. 11, an enhanced functionality, the master-station or base-station functionality, is again assigned to a first transceiver SEG1 of the transceivers SEG assigned to the communications network KNW, while the remaining transceivers SEG, also called second transceivers SEG2, hold a device-specific basic functionality, although they, like the first transceiver SEG1, are also generally capable of taking over the master-station or base-station functionality. According to the functionality assigned, the first transceiver SEG1 functions as a master station or base station BS. From the viewpoint of the master station or base station BS, the second transceivers SEG2, which are located directly or indirectly within communication range of the master station or base station BS, are again first transceivers E-SEG.

The communications network KNW in FIG. 11 differs from the previous communications networks KNW in FIGS. 1 and 5 in that the transceiver SEG corresponding to the fifth radio cell FZ5 is connected via a fixed-network connection to a fixed network FN as a third transceiver SEG3 alongside conventional fixed-network stations FNS1 . . . FNS3, of which a first fixed-network station FNS1 is contained in the fifth radio cell FZ5 and a second and third fixed-network station FNS2, FNS3 are contained both in the fourth radio cell FZ4 and in the fifth radio cell FZ5.

According to FIG. 11, the transceiver SEG corresponding to the fourth radio cell FZ4 is the transceiver which as first transceiver SEG1 holds the master-station or base-station functionality. The transceiver SEG of the fourth radio cell FZ4 can either have the functionality assigned to it by the operator of the communications network KNW or receive it from the communications network KNW by means of a special assignment procedure.

This special assignment procedure will be explained below for the communications network KNW shown in FIG. 11:

In the communications network KNW, none of the associated transceivers SEG is again aware of the existence of the respectively adjacent transceiver SEG or of the other transceivers SEG. Each transceiver SEG will therefore again determine firstly whether transceivers SEG are present in its vicinity or whether a communications network KNW already even exists. If in the process it establishes that there is no adjacent transceiver SEG, then it will again of its own accord start to establish a communications network. This is again done by the transceiver concerned SEG emitting a network existence signal NES as a broadcast signal. If an adjacent transceiver SEG receives the emitted network existence signal NES, then the receiving transceiver SEG itself again refrains from emitting a network existence signal NES. If the transceiver SEG receiving the network existence signal NES receives the network existence signal NES only once—in this case the transceiver SEG transmitting the network existence signal NES is again a primary transceiver P-SEG, then from the viewpoint of the receiving transceiver SEG, the primary transceiver P-SEG holds the enhanced functionality, i.e. the master-station or base-station functionality, and is consequently the first transceiver SEG1 that functions as a base station BS.

This case is represented in FIG. 11 by the transceivers SEG in the fourth radio cell FZ4 and the fifth radio cell FZ5. The transceiver SEG in the fourth radio cell FZ5 broadcasts the network existence signal NES. This network existence signal NES can, in accordance with the radio coverage area of the communications network KNW, be received both by the transceiver SEG in the first radio cell FZ1 and by the transceiver SEG in the fifth radio cell FZ5. While the transceiver SEG in the first radio cell FZ1 receives the network existence signal NES from multiple adjacent transceivers SEG, the transceiver SEG in the fifth radio cell FZ5, receives the network existence signal NES only once, from the transceiver SEG in the fourth radio cell FZ4. The transceiver SEG in the fourth radio cell FZ4 is consequently, from the viewpoint of the transceiver SEG in the fifth radio cell FZ5, the previously mentioned primary transceiver P-SEG. The extent to which this primary transceiver P-SEG in the fourth radio cell FZ4 now also holds the master-station or base-station functionality and consequently is the first transceiver SEG1 depends ultimately on how the transceiver SEG in the first radio cell FZ1, which has also received the network existence signal NES transmitted by the primary transceiver P-SEG in the fourth radio cell FZ4, behaves in relation to this network reception signal NES.

If a transceiver SEG receiving the network existence signal NES, such as the transceiver SEG in the first radio cell FZ1, receives such a network existence signal NES respectively from multiple transceivers SEG, secondary transceivers S-SEG, instead of from one transceiver SEG, the primary transceiver P-SEG—according to FIG. 11 these are the transceivers SEG in the second radio cell FZ2, the third radio cell FZ3 and the fourth radio cell FZ4—then the transceiver SEG receiving the various network existence signals NES in the first radio cell FZ1 again transmits respectively either to all the secondary transceivers S-SEG or to all the secondary transceivers S-SEG with the exception of a first secondary transceiver S1-SEG an instruction signal AS, by means of which the secondary transceiver S-SEG concerned is instructed respectively to discontinue emitting the network existence signal NES.

In the first-mentioned case, the transceiver SEG receiving the network existence signals NES would then be the first transceiver SEG1 which holds the master-station or base-station functionality. In the last-mentioned case, by contrast, the first secondary transceiver S1-SEG which did not receive the instruction signal AS would be the first transceiver SEG1 which holds the master-station or base-station functionality.

According to FIG. 11, the instruction signal AS is transmitted by the transceiver SEG in the first radio cell FZ1 to the transceivers SEG in the second radio cell FZ2 and the third radio cell FZ3, while the transceiver SEG in the fourth radio cell FZ4 does not receive the instruction signal AS. The transceiver SEG in the fourth radio cell FZ4 is thus simultaneously primary transceiver P-SEG (from the viewpoint of the transceiver SEG in the fifth radio cell FZ5) and first secondary transceiver S1-SEG (from the viewpoint of the transceiver SEG in the first radio cell FZ1) and consequently ultimately the first transceiver SEG1 which according to the assignment procedure also holds the master-station or base-station functionality and thus functions as a base station BS.

In addition, in the first phase of the first auto-configuration scenario, at least one portion of the signal traffic SV of transceivers SEG located within communication range of the measuring transceiver SEG is again recorded by each transceiver SEG, both by the first transceiver SEG1 and by the second transceivers SEG2, at regular time intervals during a measurement phase. With the aid of this recorded signal traffic SV the receivability of the transceivers SEG is again determined and four advisory information items HWI about the overall transceivers SEG received are again generated and stored by each transceiver SEG respectively.

Thus, a first advisory information HWI1 by means of which the number of transceivers SEG received is specified, a second advisory information HWI2 which specifies the reception quality with which the received transceivers SEG are respectively received, a third advisory information HWI3 by means of which the existence of a privileged transceiver SEG among the transceivers received SEG is specified, and a fourth advisory information HWI4 by means of which the device types of the transceivers SEG received are specified, are generated and stored.

Alternatively, it is again also possible to generate and to store fewer than or more than four advisory information items HWI. Thus, it is, for example, possible to restrict oneself only to the first advisory information HWI1.

In addition, in this first phase of the third auto-configuration scenario according to FIG. 11, a special identification information IDI is emitted by the transceiver SEG corresponding to the fifth radio cell FZ5 and connected to the fixed network FN—the second and simultaneously third transceiver SEG2, SEG3—by means of which it informs the transceivers SEG located within direct communication range—according to FIG. 11 these are the transceivers SEG located or residing in the fifth radio cell FZ5, i.e. also the first transceiver SEG1 which holds the master-station or base-station functionality—about the available fixed-network access.

The third transceiver SEG3, which has fixed-network access, receives from the first transceiver SEG1, preferably in a countermove, a network state information NZI, by means of which the third transceiver SEG3 receives current configuration data about the communications network KNW and the transceivers SEG assigned to this communications network transmitted by the first transceiver SEG1.

Figure 13:
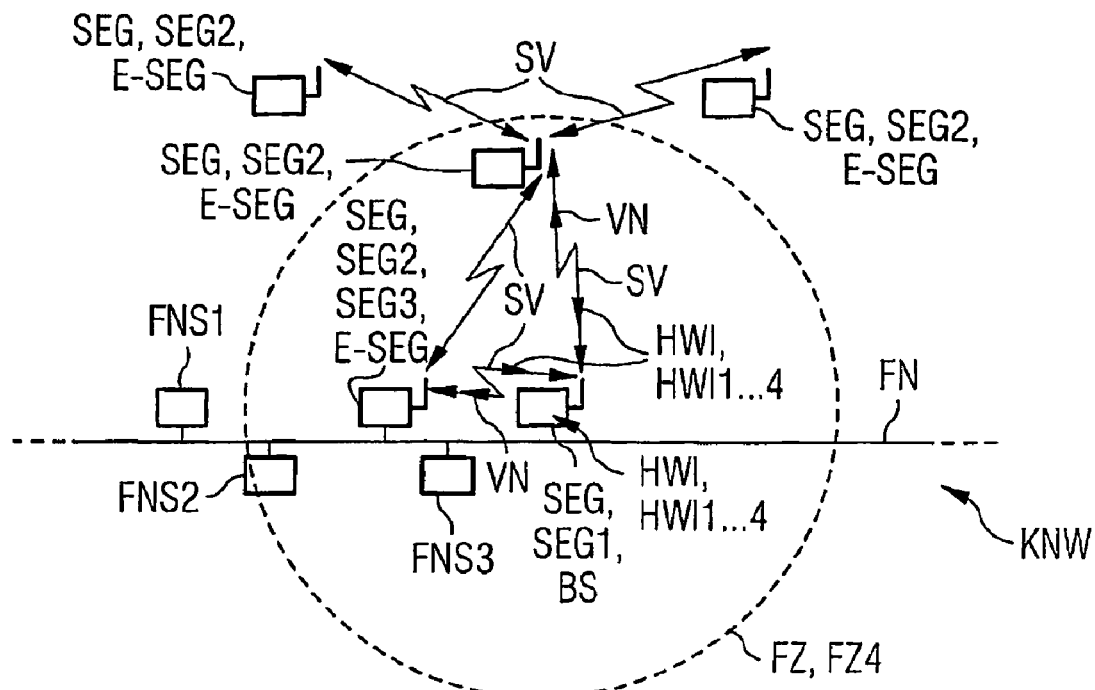

In a second phase of the third auto-configuration scenario according to FIG. 13, in which only the five transceivers SEG, the fixed-network stations FNS1 . . . FNS3, including the fixed-network connection to the fixed network FN, and the fourth radio cell FZ4 are shown from the communications network KNW in FIG. 11, a distribution message VN is again emitted by the transceiver SEG with the master-station or base-station functionality in the fourth radio cell FZ4, the first transceiver SEG1, by means of which distribution message the second transceivers SEG2 which can receive this distribution message are respectively prompted to transmit the advisory information HWI1 . . . HWI4 generated by these devices to the first transceiver SEG1. The second transceivers SEG2 which are prompted in this regard are the two transceivers SEG also located or residing in the fourth radio cell FZ4, which correspond to the first radio cell FZ1 and the fifth radio cell FZ5 in FIG. 11. After receiving the distribution message VN, the prompted second transceivers SEG2 again transmit their generated advisory information HWI1 . . . HWI4 to the first transceiver SEG1. The first transceiver SEG1 again subsequently determines, with the aid of the advisory information HWI1 . . . HWI4 auto-generated and transmitted by the said second transceivers SEG2, which of the named second transceivers SEG2 is best suited in comparison with the first transceiver SEG1 to take over the master-station or base-station functionality from the first transceiver SEG1.

Figure 15:
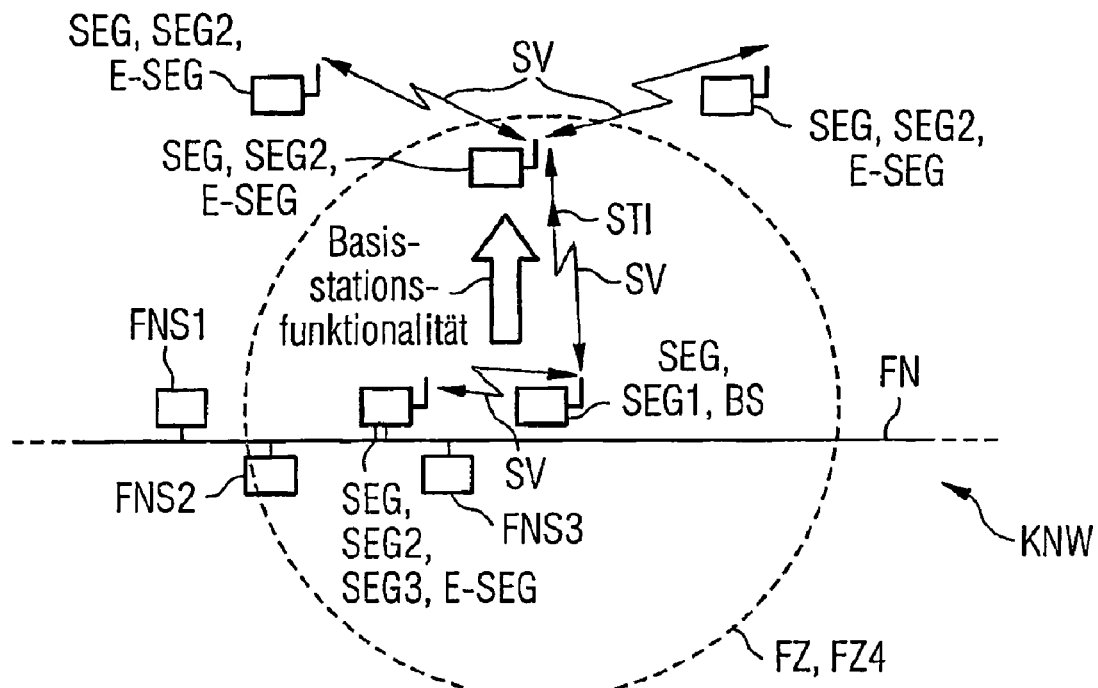

In a third phase of the third auto-configuration scenario according to FIG. 15 in which, as in FIG. 13, again only the five transceivers SEG, the fixed-network stations FNS1 . . . FNS3 including the fixed-network connection to the fixed network FN and the fourth radio cell FZ4 are shown from the communications network KNW in FIG. 11, a control information STI is again generated by the transceiver SEG with the master-station or base-station functionality in the fourth radio cell FZ4, the first transceiver SEG1, once it has, in accordance with FIG. 13, evaluated its own and received advisory information HWI1 . . . HWI4 and determined the second transceiver SEG2 best suited for taking over the functionality, and has transmitted this control information to this best suited second transceiver SEG2, the transceiver SEG corresponding, according to FIG. 11, to the first radio cell FZ1. The second transceiver SEG2 corresponding to the first radio cell FZ1 is, like the first transceiver SEG1, located in the fourth radio cell FZ4 which is why the control information STI can be transmitted directly. By means of the control information STI, the second transceiver SEG2 corresponding to the first radio cell FZ1 is informed that it is to take over the master-station or base-station functionality.

It should be mentioned at this point for form's sake that the emission of control information STI by the first transceiver SEG1 is discontinued if none of the second transceivers SEG2 is better suited in comparison with the first transceiver SEG1.

In a fourth phase of the third auto-configuration scenario according to FIG. 17, in which again only the five transceivers SEG, the fixed-network stations FNS1 ... FNS3 including the fixed-network connection to the fixed network FN and the first radio cell FZ1 are shown from the communications network KNW in FIG. 11, there is a changeover in the transceiver SEG that holds the master-station or base-station functionality. The master-station or base-station functionality again passes from the transceiver SEG of the fourth radio cell FZ4, the previous first transceiver SEG1 (cf. FIGS. 11, 13 and 15), to the transceiver SEG corresponding to the first radio cell FZ1, the new first transceiver SEG1.

In this fourth phase of the third auto-configuration scenario according to FIG. 17, the special identification information IDI is again emitted by the transceiver SEG corresponding to the fifth radio cell FZ5, connected to the fixed network FN—the second and simultaneously third transceiver SEG2, SEG3—by means of which it informs the transceivers SEG located within direct communication range—according to FIGS. 11 and 17 these are the transceivers SEG located or residing in the fifth radio cell FZ5, i.e. also the first transceiver SEG1 which holds the master-station or base-station functionality—about the available fixed-network access.

The third transceiver SEG3, which has fixed-network access, again receives from the first transceiver SEG1, preferably in a countermove, the network state information NZI, by means of which the third transceiver SEG3 obtains current configuration data about the communications network KNW and the transceivers SEG assigned to this communications network, transmitted by the first transceiver SEG1.

The auto-configuration phases illustrated in FIGS. 11, 13, 15 and 17 can again be repeated at any time. In this way, changes in the communications network, e.g. in terms of the number of associated transceivers, can be responded to flexibly for the purposes of a dynamic adaptation, and an optimal network performance and network illumination always achieved.

FIGS. 12, 14, 16 and 18 show a fourth auto-configuration scenario, again consisting of four auto-configuration phases, for achieving an optimal network performance and network illumination for a wireless, autonomous communications network KNW with a fixed-network connection and comprising a single master station or base station, the master station or base station holding the fixed-network connection at the start of the auto-configuration scenario.

The communications network KNW again has five transceivers SEG which, each again covering an idealized radio area, called a radio cell FZ, are arranged so as to lie in the center of the respective radio cell FZ such that the individual radio cells form a coherent radio coverage area of the communications network KNW, in which the transceivers SEG associated with the communications network KNW are connected to one another by radio either directly or indirectly via a transceiver and communicate with one another by means of wireless communication (transmission of signals). Thus, signal traffic SV again takes place. Once again, the signal traffic here comprises, inter alia, special broadcast messages transmitted in predetermined time frames.

The communications network KNW is operated preferably as a wireless local area network (WLAN) or as a DECT cordless telephone system, while the transceivers SEG can be configured e.g. as fixed and/or mobile devices.

The radio coverage area of the communications network KNW is, according to the representation in FIG. 12, again formed from five radio cells FZ1 ... FZ5, of which four of the five transceivers SEG are contained in a first radio cell FZ1. In this first radio cell FZ1 there is also located a fifth intersection area ÜSB5 of three radio cells adjacent to the first radio cell FZ1—a second radio cell FZ2, a third radio cell FZ3 and a fifth radio cell FZ5—in which intersection area one transceiver SEG of the four transceivers SEG is arranged.

In addition, the first radio cell FZ1 forms with the fifth radio cell FZ5 a sixth intersection area ÜSB6 which is also located in the first radio cell FZ1. The transceiver SEG corresponding to the first radio cell FZ1 and the transceiver SEG corresponding to the fifth radio cell FZ5 are arranged in this sixth intersection area ÜSB6.

Figure 12:
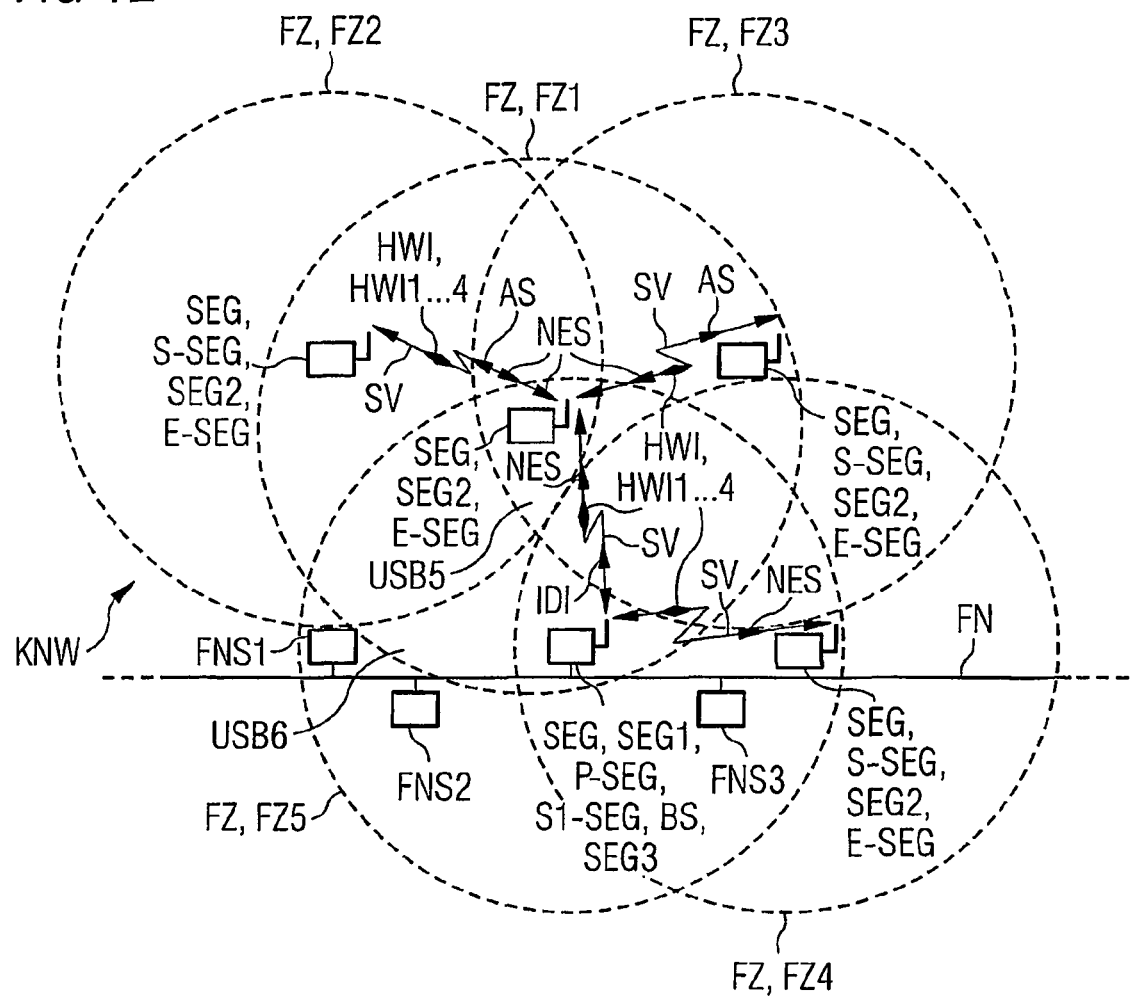

In a first phase of the fourth auto-configuration scenario (at the start of the auto-configuration scenario) according to FIG. 12, an enhanced functionality, the master-station or base-station functionality, is again allocated to a first transceiver SEG1 by the transceivers SEG assigned to the communications network KNW, while the remaining transceivers SEG, also called second transceivers SEG2, hold a device-specific basic functionality, although they also, like the first transceiver SEG1, are again generally capable of taking over the master-station or base-station functionality. According to the functionality assigned, the first transceiver SEG1 functions as a master station or base station BS. From the viewpoint of the master station or base station BS, the second transceivers SEG2, which are located directly or indirectly within communication range of the master station or base station BS, are again first transceivers E-SEG.

The communications network KNW in FIG. 12 differs from the previous communications networks KNW in FIGS. 1 and 5 in that the transceiver SEG corresponding to the fifth radio cell FZ5 is connected via a fixed-network connection to a fixed network FN as a third transceiver SEG3 alongside conventional fixed-network stations FNS1 ... FNS3, of which a first fixed-network station FNS1 and a second fixed-network station FNS2 are contained in the fifth radio cell FZ5 and a third fixed-network station FNS3 is contained both in the fourth radio cell FZ4 and in the fifth radio cell FZ5.

In addition, according to FIG. 12, the third transceiver SEG3 corresponding to the fifth radio cell FZ5 holds as first transceiver SEG1 the master-station or base-station functionality. The transceiver SEG of the fourth radio cell FZ4 can either have the functionality assigned to it by the operator of the communications network KNW or receive it from the communications network KNW by means of a special assignment procedure.

This special assignment procedure will be explained below for the communications network KNW shown in FIG. 12:

In the communications network KNW, none of the associated transceivers SEG is again aware of the existence of the respectively adjacent transceiver SEG or of the other transceivers SEG. Each transceiver SEG will therefore again determine firstly whether transceivers SEG are present in its vicinity or whether a communications network KNW already even exists. If in the process it establishes that there is no adjacent transceiver SEG, then it will again of its own accord start to establish a communications network. This is again done by the transceiver SEG concerned emitting a network existence signal NES as a broadcast signal. If an adjacent transceiver SEG receives the emitted network existence signal NES, then the receiving transceiver SEG itself again refrains from emitting a network existence signal NES. If the transceiver SEG receiving the network existence signal NES receives the network existence signal NES only once—in this case the transceiver SEG transmitting the network existence signal NES is again a primary transceiver P-SEG, then from the viewpoint of the receiving transceiver SEG the primary transceiver P-SEG holds the enhanced functionality, i.e. the master-station or base-station functionality, and is consequently the first transceiver SEG1 that functions as a base station BS.

This case is represented in FIG. 12 by the transceivers SEG in the fourth radio cell FZ4 and the fifth radio cell FZ5. The transceiver SEG in the fifth radio cell FZ5 broadcasts the network existence signal NES. This network existence signal NES can, in accordance with the radio coverage area of the communications network KNW, be received both by the transceiver SEG in the first radio cell FZ1 and by the transceiver SEG in the fourth radio cell FZ4. While the transceiver SEG in the first radio cell FZ1 receives the network existence signal NES from multiple adjacent transceivers SEG, the transceiver in the fourth radio cell FZ4 receives the network existence signal NES only once, from the transceiver SEG in the fifth radio cell FZ5. The transceiver SEG in the fifth radio cell FZ5 is consequently, from the viewpoint of the transceiver SEG in the fourth radio cell FZ4, the previously mentioned primary transceiver P-SEG. The extent to which this primary transceiver P-SEG in the fifth radio cell FZ5 now also holds the master-station or base-station functionality and consequently is the first transceiver SEG1 depends ultimately on how the transceiver SEG in the first radio cell FZ1, which has also received the network existence signal NES transmitted by the primary transceiver P-SEG in the fifth radio cell FZ5, behaves in relation to this network reception signal NES.

If a transceiver SEG receiving the network existence signal NES, such as the transceiver SEG in the first radio cell FZ1, receives such a network existence signal NES from multiple transceivers SEG, secondary transceivers S-SEG, respectively instead of from one transceiver SEG, the primary transceiver P-SEG—in FIG. 12 these are the transceivers SEG in the second radio cell FZ2, the third radio cell FZ3 and the fifth radio cell FZ5—then the transceiver SEG receiving the various network existence signals NES in the first radio cell FZ1 again transmits either to all the secondary transceivers S-SEG or to all the secondary transceivers S-SEG with the exception of a first secondary transceiver S1-SEG an instruction signal AS, by means of which the secondary transceiver S-SEG concerned is instructed respectively to discontinue emitting the network existence signal NES.

In the first-mentioned case, the transceiver SEG receiving the network existence signals NES would then be the first transceiver SEG1 which holds the master-station or base-station functionality. In the last-mentioned case, by contrast, the first secondary transceiver S1-SEG which did not receive the instruction signal AS would be the first transceiver SEG1 which holds the master-station or base-station functionality.

According to FIG. 12, the instruction signal AS is transmitted by the transceiver SEG in the first radio cell FZ1 to the transceivers SEG in the second radio cell FZ2 and the third radio cell FZ3, while the transceiver SEG in the fifth radio cell FZ5 does not receive the instruction signal AS. The transceiver SEG in the fifth radio cell FZ5 is thus simultaneously primary transceiver P-SEG (from the viewpoint of the transceiver SEG in the fourth radio cell FZ4) and first secondary transceiver S1-SEG (from the viewpoint of the transceiver SEG in the first radio cell FZ1) and consequently ultimately the first transceiver SEG1 which, according to the assignment procedure, also holds the master-station or base-station functionality and thus functions as a base station BS which simultaneously also possesses access to the fixed network FN.

In addition, in the first phase of the fourth auto-configuration scenario, at least one portion of the signal traffic SV of transceivers SEG located within communication range of the measuring transceiver SEG is again recorded by each transceiver SEG, both by the first transceiver SEG1 and by the second transceivers SEG2, at regular time intervals during a measurement phase. With the aid of this recorded signal traffic SV, the receivability of the transceivers SEG is again determined and four advisory information items HWI about the overall transceivers SEG received are again generated and stored by each transceiver SEG respectively.

Thus, a first advisory information HWI1 by means of which the number of transceivers SEG received is specified, a second advisory information HWI2 which specifies the reception quality with which the received transceivers SEG are respectively received, a third advisory information HWI3 by means of which the existence of a privileged transceiver SEG among the transceivers received SEG is specified, and a fourth advisory information HWI4 by means of which the device types of the transceivers SEG received are specified are generated and stored.

Alternatively, it is again also possible to generate and to store fewer or more than four advisory information items HWI. Thus, it is, for example, possible to restrict oneself only to the first advisory information HWI1.

In addition, in this first phase of the fourth auto-configuration scenario according to FIG. 12, a special identification information IDI is emitted by the transceiver SEG corresponding to the fifth radio cell FZ5 and connected to the fixed network FN—the first and simultaneously third transceiver SEG1, SEG3—by means of which it informs the transceivers SEG located within direct communication range—according to FIG. 12 these are the transceivers SEG located or residing in the fifth radio cell FZ5—about the available fixed-network access.

Since the first transceiver SEG1 and the third transceiver SEG3 are one and the same device, in contrast to the third auto-configuration scenario, no network state information NZI is now transmitted.

Figure 14:
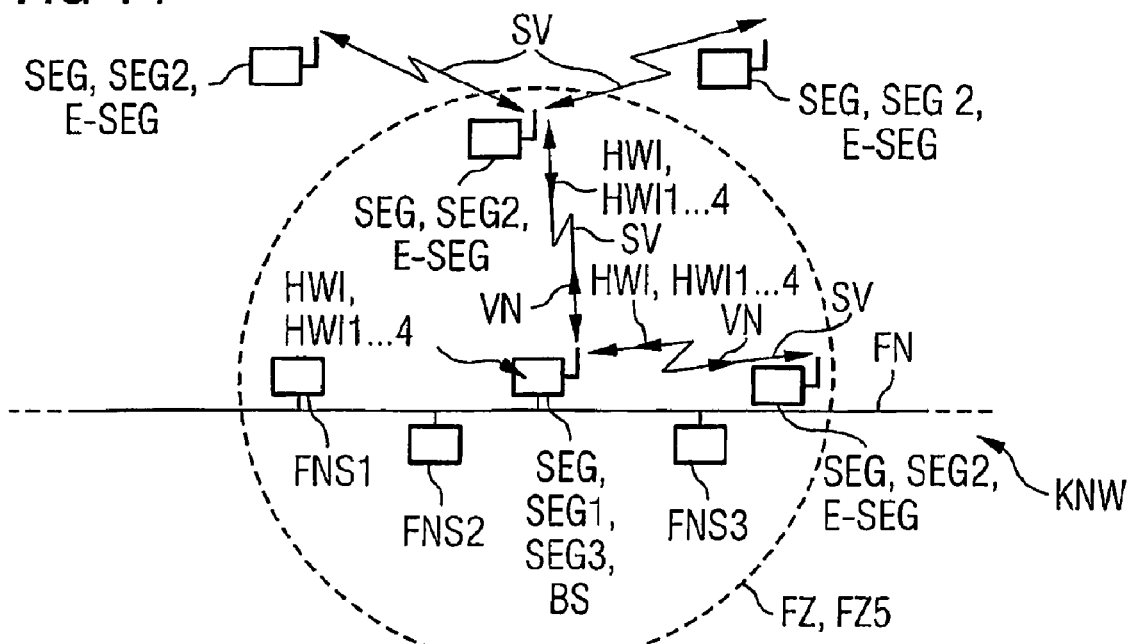

In a second phase of the fourth auto-configuration scenario according to FIG. 14, in which only the five transceivers SEG, the fixed-network stations FNS1 . . . FNS3, including the fixed-network connection to the fixed network FN, and the fifth radio cell FZ5 are shown from the communications network KNW according to FIG. 14, a distribution message VN is again emitted by the transceiver SEG with the master-station or base-station functionality in the fifth radio cell FZ5, the first and third transceiver SEG1, SEG3, by means of which distribution message the second transceivers SEG2 which can receive this distribution message are respectively prompted to transmit the advisory information HWI1 . . . HWI4 generated by these devices to the first and third transceiver SEG1, SEG3. The second transceivers SEG2 which are prompted in this regard are the two transceivers SEG also located or residing in the fifth radio cell FZ5, which correspond to the first radio cell FZ1 and the fourth radio cell FZ4 in FIG. 12. After receiving the distribution message VN, the prompted second transceivers SEG2 again transmit their generated advisory information HWI1 . . . HWI4 to the first and third transceiver SEG1, SEG3. The first and third transceiver SEG1, SEG3 again subsequently determines, with the aid of the advisory information HWI1 . . . HWI4 auto-generated and transmitted by the named second transceivers SEG2, which of the named second transceivers SEG2 is best suited in comparison with the first transceiver SEG1 to take over the master-station or base-station functionality from the first and third transceiver SEG1, SEG3.

Figure 16:
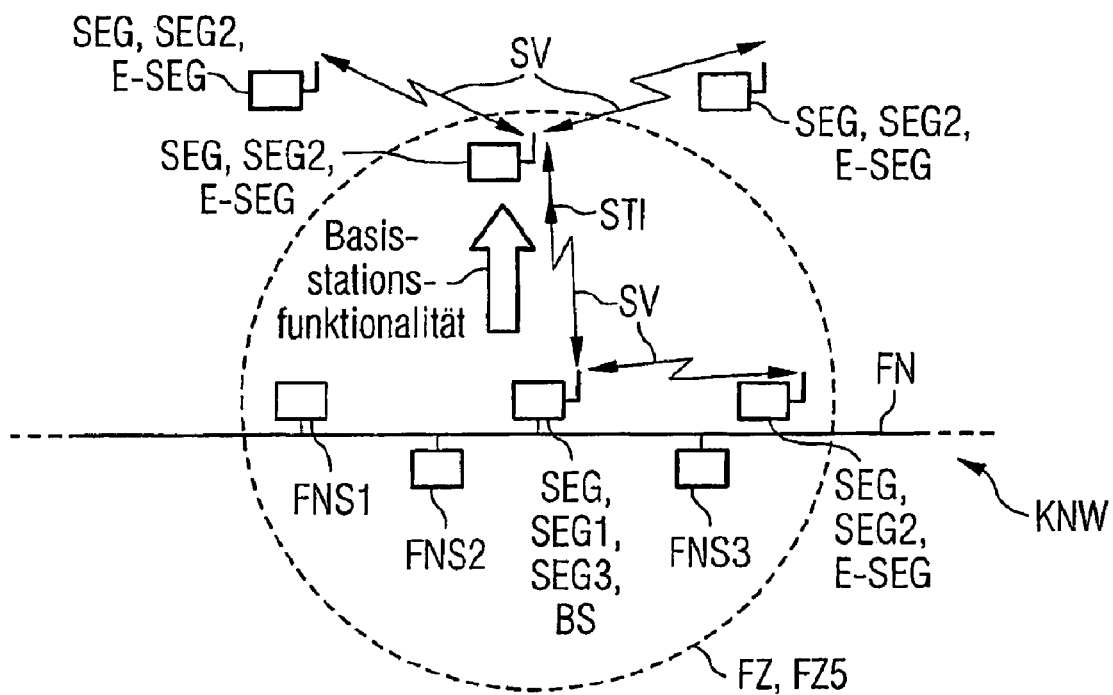

In a third phase of the fourth auto-configuration scenario according to FIG. 16 in which, as in FIG. 14, again only the five transceivers SEG, the fixed-network stations FNS1 . . .

FNS3 including the fixed-network connection to the fixed network FN and the fifth radio cell FZ5 are shown from the communications network KNW in FIG. 12, a control information STI is again generated by the transceiver SEG with the master-station or base-station functionality in the fifth radio cell FZ5, the first and third transceiver SEG1, SEG3, once it has, in accordance with FIG. 14, evaluated its own and received advisory information HWI1 . . . HWI4 and determined the second transceiver SEG2 best suited for taking over the functionality, and has transmitted this control information to this best suited second transceiver SEG2, the transceiver SEG corresponding, according to FIG. 12, to the first radio cell FZ1. The second transceiver SEG2 corresponding to the first radio cell FZ1 is, like the first and third transceiver SEG1, SEG3, located in the fifth radio cell FZ5, which is why the control information STI can be transmitted directly. By means of the control information STI, the second transceiver SEG2 corresponding to the first radio cell FZ1 is informed that it is to take over the master-station or base-station functionality.

It should again be mentioned at this point for form's sake that the emission of control information STI by the first and third transceiver SEG1, SEG3 is discontinued if none of the second transceivers SEG2 is better suited in comparison with the first and third transceiver SEG1, SEG3.

In a fourth phase of the fourth auto-configuration scenario according to FIG. 18, in which again only the five transceivers SEG, the fixed-network stations FNS1 . . . FNS3 including the fixed-network connection to the fixed network FN and the first radio cell FZ1 are shown from the communications network KNW in FIG. 12, there is a changeover in the transceiver SEG that holds the master-station or base-station functionality. The master-station or base-station functionality again passes from the transceiver SEG of the fifth radio cell FZ5, the previous first and third transceiver SEG1, SEG3 (cf. FIGS. 12, 14 and 16), to the transceiver SEG corresponding to the first radio cell FZ1, the new first transceiver SEG1.

In this fourth phase of the fourth auto-configuration scenario according to FIG. 18, the special identification information IDI is again emitted e.g. by the transceiver SEG corresponding to the fifth radio cell FZ5, connected to the fixed network FN—now the second and simultaneously third transceiver SEG2, SEG3—by means of which it informs the transceivers SEG located within direct communication range—according to FIGS. 12 and 18 these are the transceivers SEG located or residing in the fifth radio cell FZ5, i.e. also the first transceiver SEG1 which now holds the master-station or base-station functionality—about the available fixed-network access.

The third transceiver SEG3 which has fixed-network access again receives from the first transceiver SEG1, preferably in a countermove, a network state information NZI, by means of which the third transceiver SEG3 obtains current configuration data about the communications network KNW and the transceivers SEG assigned to this communications network, transmitted by the first transceiver SEG1.

The auto-configuration phases represented and described in FIGS. 12, 14, 16 and 18 can again be repeated at any time. In this way, changes in the communications network, e.g. in terms of the number of associated transceivers, can be responded to flexibly for the purposes of a dynamic adaptation, and an optimal network performance and network illumination always achieved.

FIGS. 19 to 22 show respectively the structure of a transceiver and of a master station or base station, as used in the communications networks KNW of FIGS. 1 to 18. The master station or base station and the transceiver shown in FIGS. 19 to 21 each have a central control unit ZST and transceiver means SEM, between which a first physical connection PV1 exists. In addition to this, a second physical connection PV2 for supplying power between the central control unit ZST and a power supply circuit SVGS and a third physical connection PV3 for active or inactive connection to the fixed network between the central control unit ZST and a power interface connection for the fixed network LAS, the inactive connection to the fixed network being expressed by a power interface connection LAS drawn in as a dotted line.

The central control unit ZST contains, apart from memory means SPM configured preferably as hardware and a microprocessor and microcontroller not shown in the specified FIGURES, in particular programmable modules configured e.g. as software, which are assigned to the microprocessor and/or the microcontroller. These modules comprise:

first evaluation means AWM1, second evaluation means AWM2, first information generation means IEM1, second information generation means IEM2, third information generation means IEM3, message generation means NEM, network state information generation means NZIEM, verification means PM and signal generation means SIEM.

The transceiver and the master station or base station in FIGS. 19 to 22 are connected to one another via an air interface LSS, via which a signal traffic SV is handled. The air interface LSS is provided, however, not only for the signal traffic SV between the transceiver and the master station or base station but also quite generally for the signal traffic SAV between different transceivers.

FIG. 19 shows how the transceiver SEG, configured in accordance with FIG. 11 as a third transceiver SEG3 with a connection to the fixed network FN and corresponding to the fifth radio cell FZ5, communicates with a further transceiver SEG, which according to FIG. 11 corresponds to the fourth radio cell FZ4, via the air interface LSS by means of the signal traffic SV handled via this interface such that, once this communication is terminated, the further transceiver SEG, as first transceiver SEG1, holds the master-station or base-station functionality from the viewpoint of the third transceiver SEG3 and consequently functions as master station or base station BS (assignment procedure).

In the course of this assignment procedure, which has already been discussed in detail in the description of FIG. 11, a first logical connection LV1 is established between the central control unit ZST in the third transceiver SEG3 and the central control unit ZST in the first transceiver SEG1. In accordance with this connection LV1, a network existence signal NES is generated in the central control unit ZST of the first transceiver SEG1 by the signal generation means SIEM, and the network existence signal NES is routed via the first physical connection PV1 to the transceiver means SEM and from there via the air interface LSS to the third transceiver SEG3, and in the third transceiver SEG3 the routed network existence signal NES is forwarded by the transceiver means SEM via the first physical connection PV1 to the verification means PM in the central control unit ZST.

In the third transceiver SEG3, the central control unit ZST with the verification means PM and the signal generation means as well as the transceiver means have been configured such that it is determined whether the network existence signal NES has been received and is consequently available, whereby (i) if only the network existence signal NES from the first transceiver SEG1 is available, the first transceiver SEG1 is a primary transceiver P-SEG that functions as master station or base station and (ii) if no network existence signal NES had been received, the third transceiver SEG3 would itself have started to establish its own network, whereby in the central control unit ZST of the third transceiver SEG3 a network existence signal NES would have been generated by the signal generation means SIEM and the network existence signal routed via the first physical connection PV1 to the transceiver means SEM and emitted from there via the air interface LSS.

In addition to this, according to FIG. 11, a second logical connection LV2 is established between the central control unit ZST in the third transceiver SEG3 and the central control unit ZST in the first transceiver SEG1 in order that the first transceiver SEG1 is informed about the existing fixed-network access and the third transceiver SEG3 obtains current configuration data about the communications network and the transceivers assigned to this communications network.

According to this connection LV2, an identification information IDI is firstly generated in the central control unit ZST of the third transceiver SEG3 by the third information generation means IEM3 and the identification information IDI routed via the first physical connection PV1 to the transceiver means SEM and from there via the air interface LSS to the first transceiver SEG1, and in the first transceiver SEG1 the routed identification information IDI is forwarded by the transceiver means SEM via the first physical connection PV1 to the memory means SPM in the central control unit ZST.

In the course of transmission of the identification information according to the second logical connection LV2 a network state information NZI is then generated in the central control unit ZST of the first transceiver SEG1 by the network state information generation means NZIEM, and the network state information NZI is routed via the first physical connection PV1 to the transceiver means SEM and from there via the air interface LSS to the third transceiver SEG3, and in the third transceiver SEG the routed network state information NZI is forwarded by the transceiver means SEM via the first physical connection PV1 to the memory means SPM in the central control unit ZST.

FIG. 20 shows how the transceiver SEG configured according to FIG. 12 as third transceiver SEG3 with the connection to the fixed network FN and corresponding to the fifth radio cell FZ5 communicates with a further transceiver SEG designated second transceiver SEG2 which according to FIG. 12 corresponds to the first radio cell FZ1 via the air interface LSS by means of the signal traffic SV handled via this interface such that the third transceiver SEG3, once this communication is terminated, also as first transceiver SEG1, holds the master-station or base-station functionality from the viewpoint of the second transceiver SEG2 and consequently functions as master station or base station BS (assignment procedure).

In the course of this assignment procedure, which has already been discussed in detail in the description of FIG. 12, the first logical connection LV1 is again established between the central control unit ZST in the first and third transceiver SEG1, SEG3 and the central control unit ZST in the second transceiver SEG2. In accordance with this connection LV1, a network existence signal NES is generated in the central control unit ZST of the first and third transceiver SEG1, SEG3 by the signal generation means SIEM, and the network existence signal NES is routed via the first physical connection PV1 to the transceiver means SEM and from there via the air interface LSS to the second transceiver SEG2, and in the second transceiver SEG2 the routed network existence signal NES is forwarded by the transceiver means SEM via the first physical connection PV1 to the verification means PM in the central control unit ZST.

In the second transceiver SEG2, the central control unit ZST with the verification means PM and the signal generation means SIEM as well as the transceiver means SEM have been configured such that it is determined whether the network existence signal NES has been received and is consequently available, whereby (i) if the network existence signal NES is available from multiple transceivers SEG designated secondary transceivers S-SEG, the second transceiver SEG2 transmits to each of the secondary transceivers S-SEG with the exception of a first secondary transceiver S1-SEG an instruction signal AS by means of which the secondary transceiver S-SEG concerned is respectively instructed to discontinue emitting the network existence signal NES, whereupon the first secondary transceiver S1-SEG is the master station or base station, (ii) if the network existence signal NES were available from multiple transceivers designated secondary transceivers S-SEG, but the second transceiver SEG2 transmitted an instruction signal AS to all the secondary transceivers S-SEG by means of which the secondary transceiver S-SEG concerned were instructed to discontinue emitting the network existence signal, whereupon the second transceiver SEG2 would be the master station or base station BS and (iii) if no network existence signal NES had been received, the second transceiver SEG2 had itself started to establish its own network, in that in the central control unit ZST of the second transceiver SEG2 a network existence signal NES had been generated by the signal generation means SIEM and the network existence signal NES routed via the first physical connection PV1 to the transceiver means SEM and emitted from there via the air interface LSS.

According to case (i), which is represented in FIG. 20, a third logical connection LV3 is established between the central control unit ZST in the second transceiver SEG2 and the secondary transceivers S-SEG. According to this connection LV3, the instruction signal AS is generated in the central control unit ZST of the second transceiver SEG2 by the signal generation means SIEM, and the instruction signal AS is routed via the first physical connection PV1 to the transceiver means SEM and from there via the air interface LSS to the secondary transceivers S-SEG.

In addition to this, according to FIG. 12, a fourth logical connection LV2 is established between the central control unit ZST in the third transceiver SEG3 and the central control unit ZST in the first transceiver SEG1 in order that the second transceiver SEG2 is informed about the available fixed-network access.

According to this connection LV4, an identification information IDI is generated in the central control unit ZST of the first and third transceiver SEG1, SEG3 by the third information generation means IEM3, and the identification information IDI is routed via the first physical connection PV1 to the transceiver means SEM and from there via the air interface LSS to the second transceiver SEG2, and in the second transceiver SEG2 the routed identification information IDI is forwarded by the transceiver means SEM via the first physical connection PV1 to the memory means SPM in the central control unit ZST.

FIG. 21 shows how the transceiver SEG, configured according to FIGS. 12, 14 and 16 as third transceiver SEG3 with the connection to the fixed network FN, functioning as master station or base station BS with the assigned master-station or base-station functionality and corresponding to the fifth radio cell FZ5, communicates with a further transceiver SEG, designated second transceiver SEG2 which, according to FIG. 12, corresponds to the first radio cell FZ1, via the air interface LSS by means of the signal traffic SV handled via this interface such that the first and third transceiver SEG1, SEG3, once this communication is terminated, can surrender the master-station or base-station functionality to the second transceiver SEG2.

To this end, a fifth logical connection LV5 is firstly established between the central control unit ZST in the first and third transceiver SEG1, SEG3 and the central control unit ZST in the second transceiver SEG2 and between the second transceiver SEG2 and the further second transceivers SEG2, the secondary transceivers S-SEG.

According to this connection LV5, both in the central control unit ZST of the first and third transceiver SEG1, SEG3 and in the central control unit ZST of the second transceiver SEG2 the signal traffic SV received from transceivers respectively located within communication range, i.e. adjacent transceivers,—in the case of the first and third transceiver SEG1, SEG3 this is e.g. the second transceiver SEG 2 and in the case of the second transceiver SEG these are the secondary transceivers S-SEG—via the air interface LSS by means of the transceiver means SEM is routed to the first evaluation means AWM1. The first evaluation means AWM1 in the central control unit ZST are configured such that at regular time intervals during a measurement phase at least one portion of a signal traffic SV is recorded by the transceivers located within communication range or adjacent transceivers and the receivability of these transceivers thereby determined.

In addition, the first evaluation means AWM1 are configured such that an evaluation information AWI concerning the change in signal quality of the signal traffic SV respectively received by the transceivers is generated in the measurement phase and, depending on this evaluation information AWI, the regularity of the time intervals for the measurement phase measured.

In the respective central control unit ZST, the first evaluation means AWM1, the first information generation means IEM1 and the memory means SPM interact in such a way, i.e. are configured in such a manner and form a common functional unit such that at least one advisory information HWI, preferably, however, four advisory information items HWI1 . . . 4, about the overall transceivers received is generated and stored.

Following this, a sixth logical connection LV6 is established between the central control unit ZST in the first and third transceiver SEG1, SEG3 and the central control unit ZST in the second transceiver SEG2.

According to this connection LV6, a distribution message VN is generated in the central control unit ZST of the first and third transceiver SEG1, SEG3 by the first message generation means NEM, and the distribution message VN is routed via the first physical connection PV1 to the transceiver means SEM and from there via the air interface LSS to the second transceiver SEG2, and in the second transceiver SEG2 the routed distribution message VN is forwarded by the transceiver means SEM via the first physical connection PV1 to the memory means SPM in the central control unit ZST.

By means of the distribution message VN, the transceivers which have received this message and which have for their part respectively also generated and stored at least one advisory information HWI, HWI1 . . . 4 about the transceivers received in total by the respective transceiver—according to the diagram in FIG. 21 this is the second transceiver SEG2—are prompted to transmit these generated and stored advisory information items HWI, HWI1 . . . 4 to the first and third transceiver SEG1, SEG3.

In the course of transmission of the distribution message, the stored advisory information items HWI, HWI1 . . . 4 are then, in accordance with the sixth logical connection LV8 in the central control unit ZST, read out from the memory means SPM, and the advisory information items HWI, HWI1 . . . 4 read out are routed via the first physical connection PV1 to the transceiver means SEM and from there via the air interface LSS to the third transceiver SEG3, and in the first and third transceiver SEG1, SEG3 the routed advisory information items HWI, HWI1 . . . 4 are forwarded by the transceiver means SEM via the first physical connection PV1 to the second evaluation means AWM2 in the central control unit ZST.

In the central control unit ZST of the first and third transceiver SEG1, SEG3, the second evaluation means AWM2 and the memory means SPM interact in such a way, i.e. are configured in such a manner and form a common functional unit such that with the aid of the advisory information transmitted to the first and third transceiver SEG1, SEG3 and auto-generated by the first and third transceiver SEG1, SEG3 it is determined whether the second transceiver SEG2 is better suited as master station or base station in comparison with the first and third transceiver SEG1, SEG3 and should therefore take over the master-station or base-station functionality.

On the basis of the evaluation which has produced the outcome that the second transceiver SEG2 is better suited, a seventh logical connection LV2 is established between the central control unit ZST in the first and third transceiver SEG1, SEG3 and the central control unit ZST in the second transceiver SEG2.

According to this connection LV7, a control information STI is generated in the central control unit ZST of the first and third transceiver SEG1, SEG3 by the second information generation means IEM2, and the control information STI is routed via the first physical connection PV1 to the transceiver means SEM and from there via the air interface LSS to the second transceiver SEG2, and in the second transceiver SEG2 the routed control information STI is forwarded by the transceiver means SEM via the first physical connection PV1 to the central control unit ZST. By means of the control information STI, the second transceiver SEG2 is prompted to take over the master-station or base-station functionality.

FIG. 22 shows how the transceiver SEG, configured as a third transceiver SEG3 with a connection to the fixed network FN and corresponding to the fifth radio cell FZ5, communicates with a first transceiver SEG1 which, according to FIG. 18 corresponds to the first radio cell FZ1 and has taken over the master-station or base-station functionality and consequently functions as master station or base station BS, via the air interface LSS by means of the signal traffic SV handled via this interface such that the first transceiver SEG1 is informed about the fixed-network access available and the third transceiver SEG3 obtains current configuration data about the communications network and the transceivers assigned to this network.

To this end, an eighth logical connection LV8 is established between the central control unit ZST in the third transceiver SEG3 and the central control unit ZST in the first transceiver SEG1.

According to this connection LV8, an identification information IDI is firstly generated in the central control unit ZST of the third transceiver SEG3 by the third information generation means IEM3, and the identification information IDI is routed via the first physical connection PV1 to the transceiver means SEM and from there via the air interface LSS to the first transceiver SEG1, and in the first transceiver SEG1 the routed identification information IDI is forwarded by the transceiver means SEM via the first physical connection PV1 to the memory means SPM in the central control unit ZST.

In the course of transmission of the identification information, a network state information NZI is then generated in accordance with the eighth logical connection LV8 in the central control unit ZST of the first transceiver by the network state generation means NZIEM, and the network state information is routed via the first physical connection PV1 to the transceiver means SEM and from there via the air interface LSS to the third transceiver SEG3, and in the central control unit ZST of the third transceiver SEG3 the routed network state information NZI is forwarded by the transceiver means SEM via the first physical connection PV1 to the memory means SPM.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method for establishing a wireless communication network, said comprising:
    assigning a base station functionality to at least one first transceiver among a plurality of transceivers communicatively coupled in the network;
    establishing operation of second transceivers via at least one further second transceiver that is within communication range of the first transceiver;
    recording, in each transceiver, at least a part of a signal traffic at regular time intervals during a measurement phase;
    determining, using the signal traffic, the capability of each transceiver to receive transmissions from the plurality of transceivers;
    generating advisory information in each transceiver based on the determined capabilities;
    transmitting a distribution message by the first transceiver after the measurement phase is completed, wherein each transceiver transmits the advisory information to the first transceiver in response to receiving the distribution message;
    determining which of the second transceivers are best suited to take over base station functionality from the first transceiver using the advisory information;
    generating and transmitting control information from the first transceiver to the second transceiver determined to be best suited to take over base station functionality, wherein the received control information establishes base station functionality when executed.

2. The method according to claim 1, wherein the step of assigning a base station functionality to at least one first transceiver further comprises:
    determining in a transceiver whether network existence signals are received from transceivers located in the communication network, and if a respective determining transceiver receives a network existence signal only from a primary transceiver, then the primary transceiver is assigned a first transceiver status to maintain base station functionality.

3. The method according to claim 1, wherein the step of assigning a base station functionality to at least one first transceiver further comprises:
    determining in a transceiver whether network existence signals are received from transceivers located in the communication network, and if a respective determining transceiver receives a network existence signal from multiple transceivers, the determining transceiver transmits an instruction signal to the transceivers to stop transmission of network existence signals.

4. The method according to claim 3, wherein, if the determining transceiver determined that one of the network existence signals are received from a first secondary receiver, the instruction signal is not transmitted to the first secondary receiver and the first secondary receiver maintains base station functionality and is assigned a first transceiver status.

5. The method according to claim 4, wherein the first secondary receiver is the first to transmit the network existence signal.

6. The method according to claim 3, wherein the determining transceiver holds base station functionality and is assigned a first transceiver status.

7. The method according to claim 1, wherein the step of assigning a base station functionality to at least one first transceiver further comprises: determining in a transceiver whether network existence signals are received from transceivers located in the communication network, and if no network existence signals are received, the determining transceiver sets up the network by transmitting the network existence signal.

8. The method according to claim 1, further comprising:
    assigning a third transceiver to a fixed network within communication range of the first transceiver and the second transceiver determined to be best suited for taking over base station functionality.

9. The method according to claim 8, wherein, during the measurement phase, the third transceiver transmits identification information to inform transceivers of the existence fixed-network access.

10. The method according to claim 8, wherein the first transceiver transmits to the third transceiver network state information so that the third transceiver obtains current configuration data regarding the wireless communication network and the transceivers assigned to it.

11. The method according to claim 8, wherein the third transceiver operates as the first transceiver.

12. The method according to claim 1, wherein the advisory information comprises the number of transceivers received and the reception quality of the receiving capability.

13. The method according to claim 12, wherein the advisory information further comprises a device type of the received transceiver.

14. The method according to claim 1, wherein the signal traffic comprises broadcast messages transmitted in predetermined time frames.

15. The method according to claim 1, wherein, during the measurement phase, each transceiver generates evaluation information regarding a change in signal quality of the signal traffic received from other transceivers, and, depending on the evaluation information, measures the regularity of the time intervals of the measurement phase.

16. The method according to claim 1, wherein the communication network is one of a wireless local area network and a DECT cordless telephone system.

17. A wireless communication network comprising:
    a plurality of transceivers, communicatively coupled in said network, wherein at least one first transceiver among the plurality of transceivers is assigned a base station functionality, and wherein second transceivers among the plurality of transceivers establish operation via at least one further second transceiver that is within communication range of the first transceiver;

means for recording, in each transceiver, at least a part of a signal traffic at regular time intervals during a measurement phase;

means for determining, using the signal traffic, the capability of each transceiver to receive transmissions from the plurality of transceivers;

means for generating advisory information in each transceiver based on the determined capabilities;

means for transmitting a distribution message by the first transceiver after the measurement phase is completed, wherein each transceiver transmits the advisory information to the first transceiver in response to receiving the distribution message;

means for determining which of the second transceivers are best suited to take over base station functionality from the first transceiver using the advisory information;

means for generating and transmitting control information from the first transceiver to the second transceiver determined to be best suited to take over base station functionality, wherein the received control information establishes base station functionality when executed.

18. The wireless communication network according to claim 17, wherein the means of assigning a base station functionality to at least one first transceiver further comprises:

means for determining in a transceiver whether network existence signals are received from transceivers located in the communication network, and if a respective determining transceiver receives a network existence signal only from a primary transceiver, then the primary transceiver is assigned a first transceiver status to maintain base station functionality.

19. The wireless communication network according to claim 17, wherein the means for assigning a base station functionality to at least one first transceiver further comprises:

means for determining in a transceiver whether network existence signals are received from transceivers located in the communication network, and if a respective determining transceiver receives a network existence signal from multiple transceivers, the determining transceiver transmits an instruction signal to the transceivers to stop transmission of network existence signals.

20. The wireless communication network according to claim 19, wherein, if the determining transceiver determined that one of the network existence signals are received from a first secondary receiver, the instruction signal is not transmitted to the first secondary receiver and the first secondary receiver maintains base station functionality and is assigned a first transceiver status.

21. The wireless communication network according to claim 20, wherein the first secondary receiver is the first to transmit the network existence signal.

22. The wireless communication network according to claim 19, wherein the determining transceiver holds base station functionality and is assigned a first transceiver status.

23. The wireless communication network according to claim 17, wherein the means for assigning a base station functionality to at least one first transceiver further comprises:

means for determining in a transceiver whether network existence signals are received from transceivers located in the communication network, and if no network existence signals are received, the determining transceiver sets up the network by transmitting the network existence signal.

24. The wireless communication network according to claim 17, further comprising:

a third transceiver assigned to a fixed network within communication range of the first transceiver and the second transceiver determined to be best suited for taking over base station functionality.

25. The wireless communication network according to claim 24, wherein, during the measurement phase, the third transceiver transmits identification information to inform transceivers of the existence of fixed-network access.

26. The wireless communication network according to claim 24, wherein the first transceiver transmits to the third transceiver network state information so that the third transceiver obtains current configuration data regarding the wireless communication network and the transceivers assigned to it.

27. The wireless communication network according to claim 24, wherein the third transceiver operates as the first transceiver.

28. The wireless communication network according to claim 17, wherein the advisory information comprises the number of transceivers received and the reception quality of the receiving capability.

29. The wireless communication network according to claim 28, wherein the advisory information further comprises a privilege status of a received transceiver.

30. The wireless communication network according to claim 28, wherein the advisory information further comprises a device type of the received transceiver.

31. The wireless communication network according to claim 17, wherein the signal traffic comprises broadcast messages transmitted in predetermined time frames.

32. The wireless communication network according to claim 17, wherein, during the measurement phase, each transceiver generates evaluation information regarding a change in signal quality of the signal traffic received from other transceivers, and, depending on the evaluation information, measures the regularity of the time intervals of the measurement phase.

33. The wireless communication network according to claim 17, wherein the communication network is one of a wireless local area network and a DECT cordless telephone system.

34. A base station in a wireless communication network, said base station comprising:

a central control unit that controls the operational and functional flow to a plurality of transceivers, wherein the base station communicates directly or indirectly to at least one first transceiver via a further first transceiver among the plurality;

a first evaluation apparatus communicatively coupled to the central control unit, wherein, a measurement phase is executed so that at least one part of a signal traffic from the transceivers is received at regular time intervals and processed to determine a capability of each transceiver to receive transmissions from the plurality of transceivers;

a first information generation apparatus communicatively coupled to the central control unit, wherein the first information generation means generates advisory information based on the receiving capability and transmits the advisory information to the transceivers;

a message generation apparatus communicatively coupled to the central control unit, wherein the message generation apparatus generates and transmits a distribution message after the measurement phase is completed to the transceivers, and wherein the base station receives advisory information sent from the transceivers in response to the distribution message;

a second evaluation apparatus communicatively coupled to the central control unit, wherein the second evaluation apparatus determines which of the transceivers is best suited to take over base station functionality from the base station, and wherein the determination is based off of the received advisory information; and a second information generation apparatus communicatively coupled to the central control unit, wherein the second information generation apparatus generates and transmits control information to the transceiver best suited to take over base station functionality.

35. The base station according to claim 34, wherein the base station is assigned to a fixed network.

36. The base station according to claim 35, further comprising:
a third information generation apparatus, communicatively coupled to the central control unit, wherein, during the measurement phase, the base station transmits identification information via the third information generation apparatus to identify the existence of a fixed network.

37. The base station according to claim 35, further comprising:
a network state information apparatus, communicatively coupled to the central control unit, wherein the network state information apparatus transmits network state information to a transceiver holding fixed-network access, said network state information comprising current configuration data of the network and the transceivers assigned to the network.

38. The base station according to claim 35, wherein the advisory information comprises one of the number of transceivers, the reception quality of the received information from the transceivers, the existence of a privileged transceiver and device types of the transceivers.

39. The base station according to claim 35, wherein the signal traffic comprises broadcast messages transmitted in predetermined time frames.

40. The base station according to claim 35, wherein the first evaluation apparatus generates evaluation information during the measurement phase, and wherein the evaluation information comprises the change in signal quality of the signal traffic received by the transceivers, and wherein the evaluation information is used to measure a regularity of the time interval of the measurement phase.

41. The base station according to claim 35, wherein the communication network is one of a wireless local area network and a DECT cordless telephone system.

* * * * *